US011574394B1

(12) United States Patent
Gawron et al.

(10) Patent No.: US 11,574,394 B1
(45) Date of Patent: Feb. 7, 2023

(54) SYSTEMS AND METHODS FOR ARTIFICIAL INTELLIGENCE (AI) ROOF DETERIORATION ANALYSIS

(71) Applicant: The Travelers Indemnity Company, Hartford, CT (US)

(72) Inventors: Brad E. Gawron, Somers, CT (US); James A. Quadrino, Glastonbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 17/136,984

(22) Filed: Dec. 29, 2020

Related U.S. Application Data

(60) Provisional application No. 63/112,884, filed on Nov. 12, 2020.

(51) Int. Cl.
*G06K 9/00* (2022.01)
*G06T 7/00* (2017.01)
*G06T 7/11* (2017.01)
*G06K 9/62* (2022.01)
*G06N 3/02* (2006.01)
*G06V 10/40* (2022.01)

(52) U.S. Cl.
CPC .......... *G06T 7/0002* (2013.01); *G06K 9/623* (2013.01); *G06K 9/628* (2013.01); *G06N 3/02* (2013.01); *G06T 7/11* (2017.01); *G06T 7/97* (2017.01); *G06V 10/40* (2022.01); *G06T 2207/10032* (2013.01); *G06T 2207/20132* (2013.01); *G06T 2207/30184* (2013.01)

(58) Field of Classification Search
CPC . G06T 7/0002; G06T 7/11; G06T 7/97; G06T 2207/10032; G06T 2207/20132; G06T 2207/30184; G06K 9/623; G06K 9/628; G06N 3/02; G06V 10/40
See application file for complete search history.

(56) References Cited

U.S. PATENT DOCUMENTS

| | | | |
|---|---|---|---|
| 8,874,454 B2 | 10/2014 | Plummer et al. | |
| 9,262,564 B2 | 2/2016 | Plummer et al. | |
| 10,013,720 B1 | 7/2018 | Plummer et al. | |
| 10,121,241 B1 | 11/2018 | Jacob | |
| 10,181,079 B2 | 1/2019 | Labrie et al. | |
| 10,796,149 B2 | 10/2020 | Labrie et al. | |
| 10,796,427 B1 | 10/2020 | Jacob | |
| 10,839,462 B1 | 11/2020 | Plummer et al. | |
| 10,977,490 B1* | 4/2021 | Bokshi-Drotar | G06V 20/10 |
| 2017/0352100 A1* | 12/2017 | Shreve | G06V 20/10 |
| 2020/0143212 A1* | 5/2020 | Okazaki | G06K 9/6268 |
| 2021/0118165 A1* | 4/2021 | Strong | G06T 7/13 |

OTHER PUBLICATIONS

ResNet is a next-gen O&G productionsurveillance & intelligence platform. Website: https://www.resnet.ai/?gclid=EAIaIQobChMI9-Lbw8vj7wIVR8yzCh2ocgqCEAAYASAAEglHZvD_BwE. Download date: Apr. 7, 2021. 3 pps.

* cited by examiner

Primary Examiner — Dhaval V Patel
(74) Attorney, Agent, or Firm — RowanTree Law Group, PLLC; Carson C. K. Fincham

(57) ABSTRACT

An Artificial Intelligence (AI) roof deterioration analysis system that tracks changes in roofs over time by evaluating a series of features in high-resolution images.

17 Claims, 12 Drawing Sheets

640 ↘

644a

| DATA ID | TYPE | LOCATION | LOCATION ID | RESOLUTION | SIZE |
| --- | --- | --- | --- | --- | --- |
| *644a-1* | *644a-2* | *644a-3* | *644a-4* | *644a-5* | *644a-6* |
| IMG_827df4 | IMAGE | 1 MAIN ST., 21043 | ES001234 | 7.5 cm | 100k x 100k |
| IR_774651 | IR | 23 KIRK LN., 25635 | a7654dd | 10 cm | 2500 x 3200 |
| LDR927dg | LIDAR | USGS 3866 QUAD | CT-NY | 1/24000 | 10k x 10k |

644b

| LOCATION ID | LOCATION | SHAPE FILE | TYPE |
| --- | --- | --- | --- |
| *644b-1* | *644b-2* | *644b-3* | *644b-4* |
| ES001234 | 1 MAIN ST., 21043 | ES001234.shp | POLYGON |
| a7654dd | 23 KIRK LN., 25635 | A7654dd.pts | POINTS |

644c

| TILE ID | DATA ID | RESOLUTION | SIZE | SCORE |
| --- | --- | --- | --- | --- |
| *644c-1* | *644c-2* | *644c-3* | *644c-4* | *644c-5* |
| 827_0001 | IMG_827df4 | 7.5 cm | 256 x 256 | 0.3 |
| 827_0002 | IMG_827df4 | 7.5 cm | 256 x 256 | 0.4376 |

*FIG. 6*

SYSTEMS AND METHODS FOR ARTIFICIAL INTELLIGENCE (AI) ROOF DETERIORATION ANALYSIS

CROSS-REFERENCE TO RELATED APPLICATIONS

This application claims benefit and priority under 35 U.S.C. § 119(e) to, and is a Non-provisional of, U.S. Provisional Patent Application No. 63/112,884 filed on Nov. 12, 2020 and titled "ARTIFICIAL INTELLIGENCE (AI) ROOF DETERIORATION ANALYSIS", which is hereby incorporated by reference herein in its entirety.

SUMMARY

Embodiments of the invention provide systems and/or methods that identify and track changes in roofs (and/or other objects) over time by evaluating a series of features in high-resolution images (and/or other sensor data). These and other embodiments are described in detail in the description provided hereinafter.

BACKGROUND

Conventional roofing analysis systems rely on either human analysis or the use of neural networks to identify salient features within an image that match observed attributes of a human identifier. These systems process an image at a single point in time and are generally programmed to evaluate features as perceived from low-resolution imagery. Conventional systems do not adequately address how to determine aberrant changes in the condition of a roof over time and are not capable of identification of features that do not present well in low-resolution (e.g., low spatial resolution, such as fifty centimeters (50 cm) per pixel or more) imagery. These systems are also not capable of classifying or analyzing objects or features that do not match the observed attributes of the human identifier.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein:

FIG. 6 is a diagram of an example data storage structure according to some embodiments;

DETAILED DESCRIPTION

I. Introduction

Figure 1:
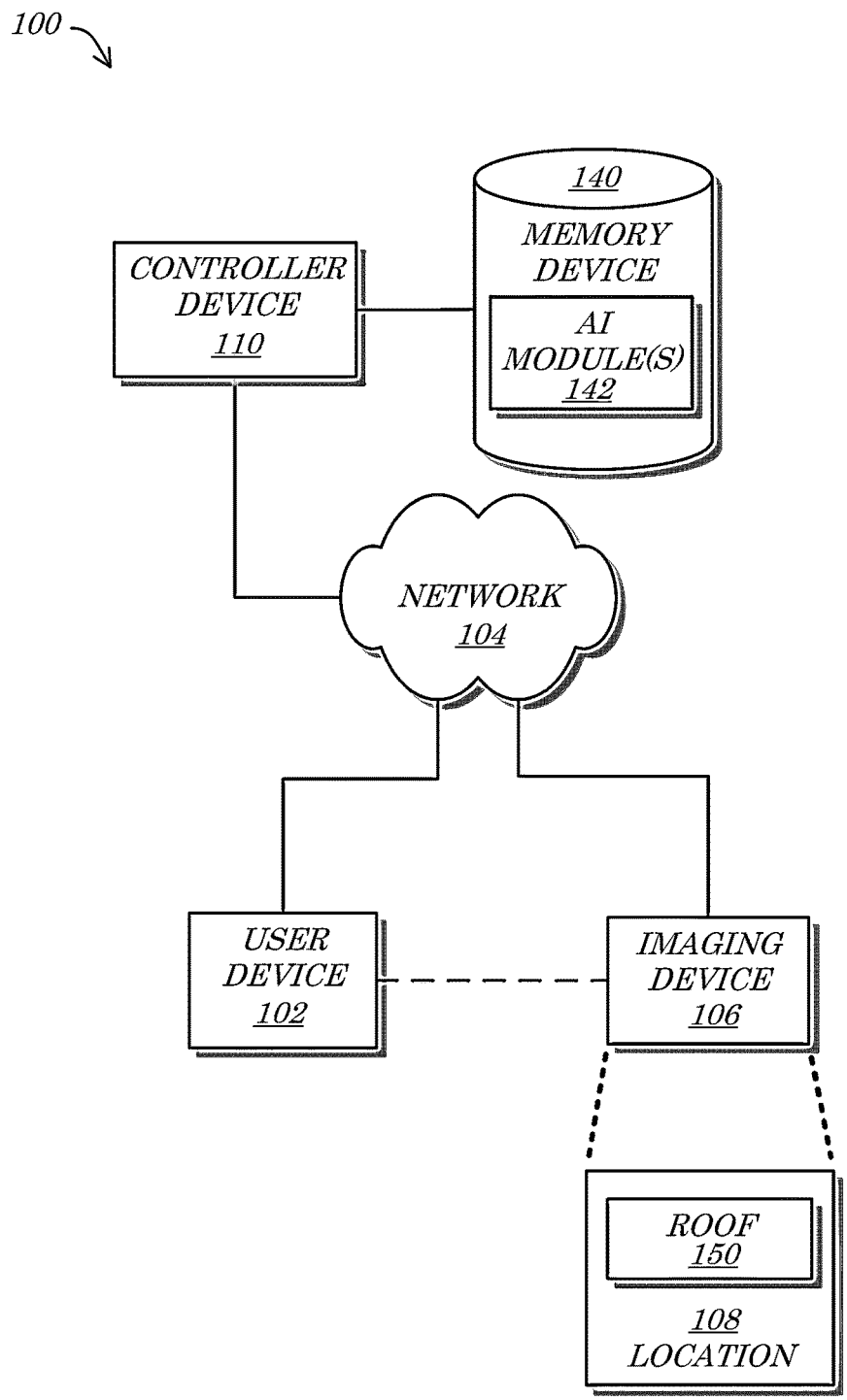
FIG. 1 is a block diagram of a system according to some embodiments.

Existing systems for roof analysis typically involve subjective human determinations developed during human analysis of imagery (e.g., aerial imagery). While advances in acquiring satellite and in-atmosphere imagery have allowed for more frequent analysis determinations (even on-demand using modern Unmanned Aerial Vehicle (UAV) technology), such advances have in some cases compromised attempts to apply neural network analysis to acquired images. As both the quantity and resolution of imagery has increased, for example, the processing power required to analyze even simple image artifacts has become prohibitive. Accordingly, previous systems generally are programmed to perform analysis on low-resolution imagery (e.g., low spatial resolution, such as fifty centimeters (50 cm) per pixel or higher) to identify only significant image artifacts, such as large holes in a roof, exposed rafters, missing roofing sections, and trees down on the roof. While these systems may assist in identifying serious roof problems, they are not capable of detecting more discrete features. Nor are they capable of quantifying metrics for total roof health, much less analyzing such metrics with respect to time such that roof deterioration (or improvement) may be evaluated.

In accordance with embodiments herein, these and other deficiencies of existing systems are remedied by providing systems, apparatus, methods, and articles of manufacture for Artificial Intelligence (AI) roof deterioration analysis. In some embodiments, for example, AI roof deterioration analysis may comprise (i) trimming high-resolution (e.g., high spatial resolution, such as ten centimeters (10 cm) per pixel or less, such as seven and one half centimeters (7.5 cm) per pixel) and large format/size (e.g., five thousand pixels by five thousand pixels (5,000 x 5,000) or more) images (and/or other sensor data) based on stored roof and/or object geometry (e.g., roof/object polygon data) and/or location data, (ii) segmenting the trimmed high-resolution image into a plurality of high-resolution image tiles (e.g., having smaller dimensions and/or sizes than the full high-resolution image, such as approximately two hundred fifty-six pixels by two hundred fifty-six pixels (256 x 256)), (iii) scoring each high-resolution image tile based on features identified by a computer vision model (e.g., utilizing a scoring range of zero (0) to one (1) in tenths or hundredths increments therebetween), (iv) summing and/or averaging the scores to define a total or overall score for the roof, (v) assigning, based on the total or overall score for the roof, a qualitative assessment of the roof (e.g., "poor", "fair", "good"), (vi) comparing the total or overall score for the roof to previous scores for the roof, and/or (vii) identifying, based on the comparison, whether the roof is stable, deteriorating, or improving. In accordance with some embodiments, the application of AI roof deterioration analysis as described herein may provide a reduction in computer processing resources, a reduction in necessary memory storage requirements, and other technical improvements. The particular AI roof deterioration analysis systems and methods described herein may, for example, permit available processing and memory resources to be utilized to achieve highly-detailed roof feature analysis that has not been realized by previous systems and methods due to processing and memory storage requirement constraints.

II. AI Roof Deterioration Analysis Systems

Referring first to FIG. 1, a block diagram of a system 100 according to some embodiments is shown. In some embodiments, the system 100 may comprise a user device 102 communicatively coupled to a network 104. In some embodiments, the user device 102 and/or the network 104 may also or alternatively be coupled to a sensor, such as an imaging device 106, that is disposed to capture data descriptive of a location 108. According to some embodiments, the user device 102 and/or the imaging device 106 may be in communication with (e.g., via the network 104) one or more of a controller device 110 and a memory device 140 (e.g., storing one or more AI modules 142). In accordance with various embodiments herein, the user device 102 may be utilized to direct, manage, and/or interface with the imaging device 106 to capture imagery (and/or other sensor data) of the location 108 and one or more objects thereof, such as a roof 150 (and/or other object identified for inspection and/or analysis). In some embodiments, the captured imagery/data may be provided from the imaging device 106 to the user device 102 (and/or the controller device 110) for imagery/sensor data analysis and execution of stored analysis rules and/or logic (e.g., the AI module(s) 142). In such a manner, for example, data descriptive of the roof 150 may be input into the system 100 and utilized to compute analytic metrics for the roof 150, such as an indication of deterioration status and/or rate of deterioration.

Fewer or more components 102, 104, 106, 108, 110, 140, 142, 150 and/or various configurations of the depicted components 102, 104, 106, 108, 110, 140, 142, 150 may be included in the system 100 without deviating from the scope of embodiments described herein. In some embodiments, the components 102, 104, 106, 108, 110, 140, 142, 150 may be similar in configuration and/or functionality to similarly named and/or numbered components as described herein. In some embodiments, the system 100 (and/or portions thereof) may comprise an automatic AI roof deterioration analysis program, system, and/or platform programmed and/or otherwise configured to execute, conduct, and/or facilitate the methods/processes 300, 400, 500 of FIG. 3, FIG. 4A, FIG. 4B, FIG. 4C, and/or FIG. 5 herein, and/or portions or combinations thereof.

The user device 102, in some embodiments, may comprise any type or configuration of computing, mobile electronic, network, user, and/or communication device that is or becomes known or practicable. The user device 102 may, for example, comprise one or more tablet computers, such as an iPad® manufactured by Apple®, Inc. of Cupertino, Calif., and/or cellular and/or wireless telephones or "smart" phones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif.. In some embodiments, the user device 102 may comprise one or more devices owned and/or operated by one or more users, such as a risk manager, underwriter, community association staff, realtor, contractor, etc. According to some embodiments, the user device 102 may communicate with the controller device 110 via the network 104 to provide imagery and/or other data captured by the imaging device 106 for roof deterioration analysis, as described herein. According to some embodiments, the user device 102 may store and/or execute specially programmed instructions (such as a mobile device application) to operate in accordance with embodiments described herein. The user device 102 may, for example, execute one or more mobile device programs that activate and/or control the imaging device 106 and/or that analyze imagery and/or other data of the location 108 and/or the roof 150, e.g., to identify discrete features of the roof 150, score individual features and/or roof image tiles, add the individual scores to define a total roof deterioration score, and/or utilize the total roof deterioration score to assign a qualitative roof status identifier to the roof 150.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the controller device 110, the user device 102, the imaging device 106, and/or the memory device 140. In some embodiments, the network 104 may comprise direct communications links between any or all of the components 102, 106, 110, 140 of the system 100. The user device 102 may, for example, be directly interfaced or connected to one or more of the imaging device 106 and/or the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The user device 102 and/or the imaging device 106 may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 106, 110, 140 of the system 100. The network 104 may comprise one or more cellular telephone networks with communication links between the user device 102, the imaging device 106, and the controller device 110, for example, and/or may comprise a BLE, NFC, RF, and/or "personal" network comprising short-range wireless communications between the user device 102 and the imaging device 106, for example.

The imaging device 106, in some embodiments, may comprise any type or configuration of device, vehicle, sensor, and/or object that is capable of capturing imagery and/or other data descriptive of the location 108 and/or the roof 150 thereof. The imaging device 106 may comprise, for example, one or more drones, UAV devices, remote-controlled or piloted aircraft, rigid and/or inflatable airships, satellites, rockets, payload delivery systems, and/or payload guidance systems. According to some embodiments, the imaging device 106 may comprise one or more commercial drones, such as one or more DJI Phantom 3 Pro drones with a twelve (12)-megapixel camera, available from Dá-Jiāng Innovations Science and Technology Co., Ltd ("DJI") of Shenzhen, China. In some embodiments, the imaging device 106 may comprise a plurality of cooperative vehicles and/or devices (not separately shown in FIG. 1), such as a Forward-Looking Infrared Radiation (FLIR) sensor, a Light Detection and Ranging (LiDAR) sensor, and/or one or more high-resolution cameras. The imagery device 106 may comprise, for example, an iXM-RS150F/iXM-RS100F full frame ultra-high resolution aerial camera capable of capturing three or four band imagery data (e.g., RGB plus Near IR) at an image resolution of 14204 x 10625 pixels, available from PhaseOne Industrial of Frederiksberg, Denmark. The imagery and/or other data captured by the imaging device 106 may generally comprise any type, quantity, and/or format of photographic, video, and/or other sensor data descriptive of the location 108 and/or the roof 150 thereof. In some embodiments, the imaging device 106 may also or alternatively comprise a server and/or datastore that is configured to provide the imagery and/or other data descriptive of the location 108 and/or the roof 150. The imaging device 106 may comprise, for example, a third-party and/or vendor device configured to supply imagery and/or other sensor data acquired from various cameras, sensors, and/or other sources.

According to some embodiments, the location 108 may comprise any location desired for analysis, such as a location of an insured object, a location of a customer, a location of an account and/or business, etc. In some embodiments, the location 108 may be identified by one or more location parameters, such as an address, postal code, map quadrant, and/or one or more coordinates and/or other identifiers (e.g., a unique geo-referenced location identifier). According to some embodiments, the location 108 may comprise various objects, such as the roof 150. For ease of reference and description herein, all such objects will simply be referred to as the roof 150. In the case that the roof 150 comprises an actual roof of a structure, such as a building, the roof 150 may comprise one or more various types of roofs, such as a commercial roof, a residential roof, a flat roof, a pitched roof, a roof with gables, dormers, chimneys, vents, drains, roof-mounted equipment, cisterns, etc., and/or any combinations thereof.

In some embodiments, the controller device 110 may comprise an electronic and/or computerized controller device, such as a computer server and/or server cluster communicatively coupled to interface with the user device 102 and/or the imaging device 106 (directly and/or indirectly). The controller device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the controller device 110 may be located remotely from one or more of the user device 102 and the imaging device 106. The controller device 110 may also or alternatively comprise a plurality of electronic processing devices located at one or more various sites and/or locations (e.g., a distributed computing and/or processing network).

According to some embodiments, the controller device 110 may store and/or execute specially-programmed instructions to operate in accordance with embodiments described herein. The controller device 110 may, for example, execute one or more programs that facilitate and/or cause the automatic detection, verification, data capture, and/or data analysis of the location 108 and/or the roof 150, as described herein. According to some embodiments, the controller device 110 may comprise a computerized processing device, such as a PC, laptop computer, computer server, and/or other network or electronic device, operated to manage and/or facilitate AI roof deterioration analysis in accordance with embodiments described herein.

In some embodiments, the controller device 110, the user device 102, and/or the imaging device 106 may be in communication with the memory device 140. The memory device 140 may store, for example, mobile device application data, discrete object data, insurance policy data, damage estimation data, location data (such as coordinates, distances, etc.), security access protocol and/or verification data, polygon and/or template data, scoring data, qualitative assessment mapping data and/or logic, and/or instructions that cause various devices (e.g., the controller device 110, the user device 102, and/or the imaging device 106) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store roof or object data, device identifier data, location data, AI module(s), image analysis data, image processing data, and/or damage estimation data provided by (and/or requested by) the user device 102 and/or the controller device 110, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC), and any various practicable form-factors, such as original, mini, and micro sizes, such as those available from Western Digital Corporation of San Jose, Calif.). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the user device 102, the imaging device 106, and/or the controller device 110 may comprise the memory device 140 or a portion thereof, for example.

Figure 2:
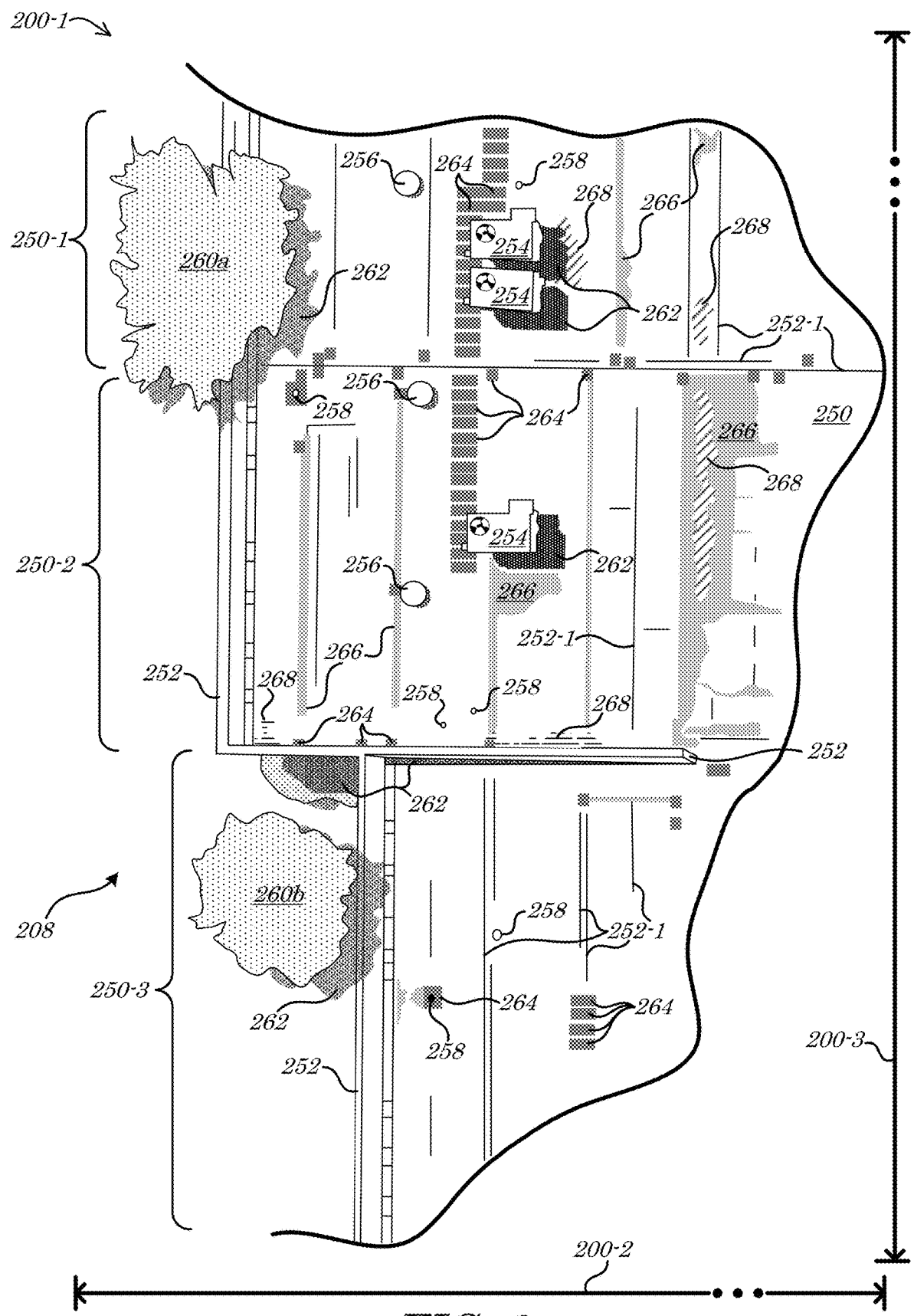
FIG. 2 is a diagram of a portion of an image according to some embodiments.

Turning to FIG. 2, a diagram of a portion of an image 200-1 according to some embodiments is shown. In some embodiments, the portion of the image 200-1 (referred to as the "image" 200-1, for ease of reference) may comprise a portion of an overall image (not shown; and/or other sensor data readout or display) comprising a first or x-dimension 200-2 and a second or y-dimension 200-3. The image 200-1 may, for example, comprise a captured or recorded depiction (graphical, numerical, and/or referential) of a location 208, such as an office building (or other property, parcel, etc.), as depicted in FIG. 2 for non-limiting purposes of example. In some embodiments, and as described herein, the image 200-1 may comprise a high-resolution image, such as an image wherein the x-dimension 200-2 and/or the y-dimension 200-3 are each greater than five thousand (5,000) pixels in length, e.g., a digital image with an image resolution of approximately twenty-four megapixels (24 Mp) or greater. In some embodiments, such as in the case that the image 200-1 comprises an aerial image (satellite and/or in-atmosphere), the image 200-1 may comprise a Ground Sampling Distance (GSD), pixel size, and/or spatial resolution of ten centimeters (10 cm) per pixel or better (e.g., "high-resolution").

According to some embodiments, at least a portion of the image 200-1 depicted in FIG. 2 may depict and/or show a roof 250 at the location 208. In some embodiments, various features and/or components of the image 200-1 may be utilized to conduct AI roof deterioration analysis as described herein. The roof 250 may, for example, comprise a plurality of distinguishable and/or distinct sections 250-1, 250-2, 250-3. In some embodiments, the sections 250-1, 250-2, 250-3 may be defined and/or distinguishable by the presence of distinct features, such as parapets, dividers, and/or walls 252 and/or roof seams 252-1. According to some embodiments, the roof 250 may comprise and/or the image 200-1 may provide indications of various other features, such as, but not limited to, roof-mounted mechanical components 254 (such as HVAC equipment, generators, etc.), protruding structures 256 (such as vent domes, vent turbine heads, chimneys, antennae, hatches), openings 258 (such as open vent stacks, risers, drains, etc.), overhanging vegetation 260*a-b* (trees, vines, and/or or other overhanging objects), shadows 262, patch areas 264 (e.g., areas having a first shade, hue, saturation level, etc., and/or comprising certain first pre-defined geometries and/or sizes), discolored areas 266 (e.g., areas having a first shade, hue, saturation level, etc., and/or comprising certain first pre-defined geometries and/or sizes), and/or deviant texture areas 268 (e.g., areas having a first texture, pattern, etc.). In some embodiments, any or all of the features 250-1, 250-2, 250-3, 252, 252-1, 254, 256, 258, 260*a-b*, 262, 264, 266, 268 may be present in the image 200-1 and/or other characteristics, objects, and/or data may be provided by the image 200. According to some embodiments, any or all of the features 250-1, 250-2, 250-3, 252, 252-1, 254, 256, 258, 260*a-b*, 262, 264, 266, 268 may be distinguishable from the underlying roof 250 based on differences in sensed data from one or more data bands, such as one or more colors, hues, positions, sizes, reflectivity, height, and/or other data values. In some embodiments, any or all of the features 250-1, 250-2, 250-3, 252, 252-1, 254, 256, 258, 260*a-b*, 262, 264, 266, 268 may be utilized by processes described herein to effectuate AI roof deterioration analysis.

Fewer or more features and/or components 200-2, 200-3, 250-1, 250-2, 250-3, 252, 252-1, 254, 256, 258, 260*a-b*, 262, 264, 266, 268 and/or various configurations of the depicted features and/or components 200-2, 200-3, 250-1, 250-2, 250-3, 252, 252-1, 254, 256, 258, 260*a-b*, 262, 264, 266, 268 may be included in the image 200-1 without deviating from the scope of embodiments described herein. In some embodiments, the features and/or components 200-2, 200-3, 250-1, 250-2, 250-3, 252, 252-1, 254, 256, 258, 260*a-b*, 262, 264, 266, 268 may be similar in configuration and/or functionality to similarly named and/or numbered features and/or components as described herein. In some embodiments, the image 200-1 (and/or portions thereof) may comprise input into an AI roof deterioration analysis program, system, and/or platform programmed and/or otherwise configured to execute, conduct, and/or facilitate the methods/processes 300, 400, 500 of FIG. 3, FIG. 4A, FIG. 4B, FIG. 4C, and/or FIG. 5 herein, and/or portions or combinations thereof.

III. AI Roof Deterioration Analysis Processes

Figure 3:
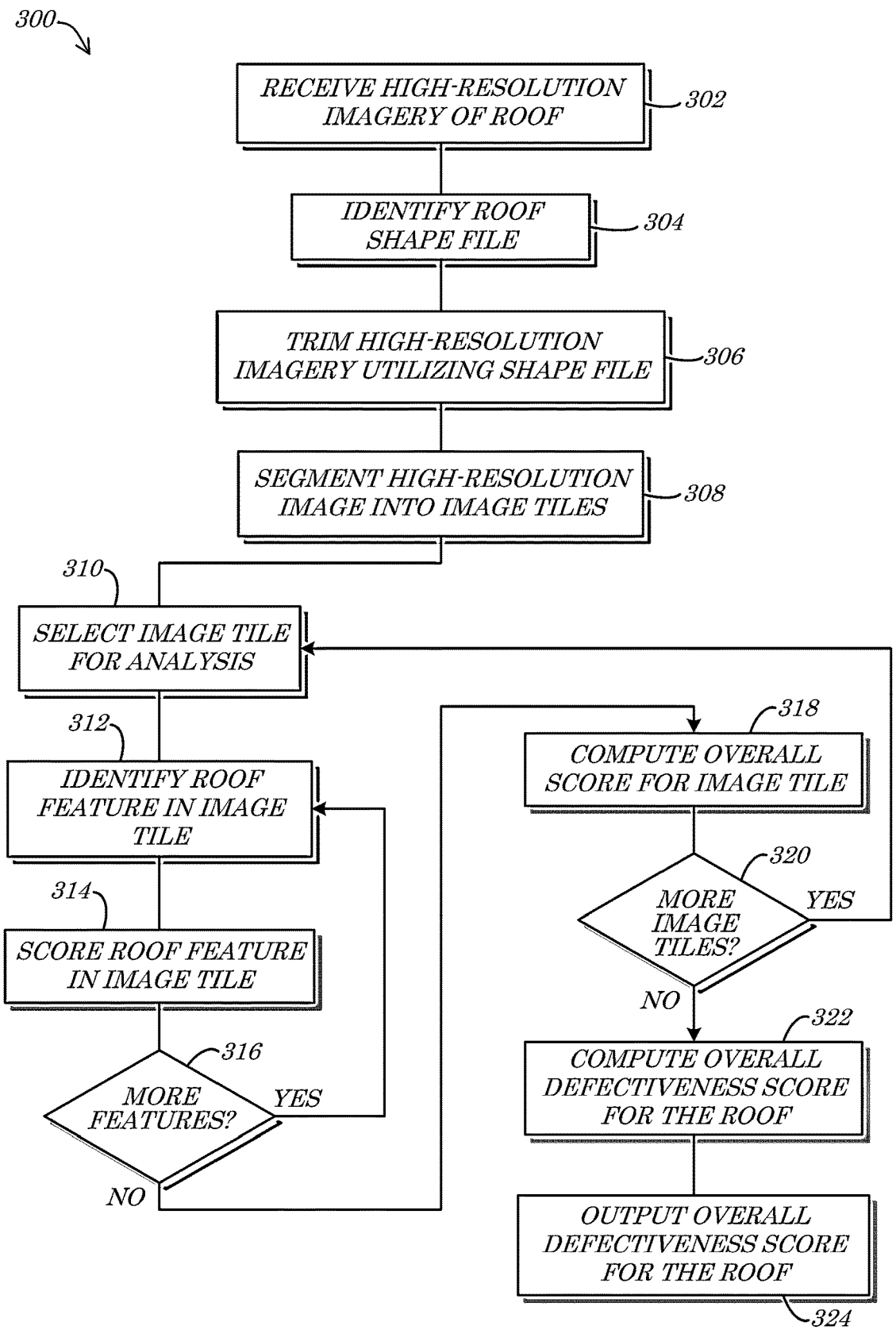
FIG. 3 is a flow diagram of a method according to some embodiments.

Referring now to FIG. 3, a flow diagram of a method 300 according to some embodiments is shown. In some embodiments, the method 300 may be performed and/or implemented by and/or otherwise associated with one or more specialized and/or specially-programmed computers (e.g., one or more of the user device 102, the imaging device 106, the controller device 110, and/or the apparatus 710 of FIG. 1 and/or FIG. 7 herein), computer terminals, computer servers, computer systems and/or networks, and/or any combinations thereof (e.g., by one or more multi-threaded and/or multi-core processing units of AI roof deterioration analysis data processing system). In some embodiments, the method 300 may be embodied in, facilitated by, and/or otherwise associated with various input mechanisms and/or interfaces (such as the interface 720 of FIG. 7 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 740, 840*a-e* of FIG. 1, FIG. 7, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

In some embodiments, the method 300 may comprise receiving (e.g., by an electronic processing device and/or from a remote sensor/imaging device) high-resolution imagery of a roof, at 302. One or more sensors, such as cameras, data transceivers, range finding devices, and/or other imagery and/or data acquisition devices, may, for example, be utilized to capture data descriptive of a geographic area that includes one or more objects, such as a roof of a structure. In some embodiments, the capturing of the data may occur in response to a request for the data. One or more signals may be transmitted from a user and/or controller device to one or more imaging devices, for example, to initiate and/or conduct data acquisition for one or more desired locations and/or objects. According to some embodiments, whether the data is captured on-demand, in response to a specific request, or as part of an overall data acquisition process, the data may be provided via one or more data storage devices, such as a data/imagery repository. In some embodiments, such data may be made available by one or more third parties that may or may not charge a fee to access the data. According to some embodiments, the data may comprise any quantity, type, and/or configuration of data that is or becomes known or practicable. The data may include, for example, a plurality of data bands, such as different color bands and/or various point data, such as elevations, locations, etc. In some embodiments, the data may comprise various imagery bands, such as visible colors (e.g., RGB), near-IR, IR, and/or point cloud data, such as a Digital Elevation Model (DEM). According to some embodiments, the image/data may be considered high-resolution. As utilized herein, "high-resolution" may generally refer to imagery/data that comprises a size or image/matrix resolution of five thousand pixels by five thousand pixels (5,000 x 5,000) or more and/or imagery/data that comprises a spatial resolution of ten centimeters (10 cm) per pixel or lower (e.g., seven and one half centimeters (7.5 cm) per pixel).

According to some embodiments, the method 300 may comprise identifying (e.g., by the electronic processing device) a roof shape file, at 304. Based on a location associated with the imagery/data, for example, shape file information may be queried from a datastore storing a plurality of available shape files. In the case that the imagery/data is acquired in response to a specific data acquisition request, the location of the imagery/data may be utilized to structure the request. In the case that the imagery/data is acquired from a set of stored imagery/data files, the location may be utilized to query the set to acquire the received imagery/data. In some cases, the location may be derived from the imagery/data itself by reading and/or analysis of metadata, tags, headers, and/or other embedded and/or associated location data elements. According to some embodiments, a plurality of shape files (and/or other shape-indicative information) may be stored in relation to a plurality of objects, such as roofs at various locations, and one or more of such files/information may be selected based at least in part on the location of the imagery/data. In some embodiments, for example, the imagery/data may be requested for a particular location for which a shape file descriptive of a shape of a roof at the location is known to exist. According to some embodiments, any or all such information may be stored in association with a customer (current and/or potential) account, profile, and/or other identifier and/or retrieved utilizing such an identifier as a data query key. In some embodiments, the shape file may comprise any type, quantity, and/or configuration of shape information that is or becomes practicable, such as, but not limited to, an image file, a template, geospatial vector data, point data, line data, polygon data, coordinate data, and/or other geospatial data. In some embodiments, the shape file may be defined and/or stored in accordance with one or more data formatting standards, such as the Environmental Systems Research Institute (ESRI) Shapefile Technical Description 3-7855 published July, 1998 by ESRI, Inc. of Redlands, Calif. In some embodiments, the shape file may define known and/or estimated extents and/or geographic locations of a particular object, such as a roof of a commercial building. According to some embodiments, a shape file may be adjusted. In the case that a shape file may not be (or may not be believed to be) a precise representation of a shape of a roof, for example, the shape file may be inflated such as by increasing the extents of the shape file and/or points thereof by a desired multiplier or factor. In such a manner, for example, the adjusted shape file may be likely to capture more area than the roof itself so that no portions of the roof are missed when applying the shape file to acquired imagery/data.

In some embodiments, the method 300 may comprise trimming (e.g., by the electronic processing device) the high-resolution imagery/data utilizing the roof shape file, at 306. While the term "trimming" is utilized for convenience of description, in some embodiments the processing of the high-resolution imagery/data (a first component) utilizing the roof shape file (a second component) may comprise one or more other and/or alternative image processing routines, such as overlapping, joining, subtracting, merging, etc. According to some embodiments, the "trimming" may comprise a removal of portions of the image/data that is believed to be extraneous for not being descriptive of the roof (or other object) in question. The roof shape file (or adjusted roof shape file) may be overlaid upon (e.g., digitally and/or mathematically) the high-resolution imagery/data, for example, by aligning the shape file with the imagery/data based on geo-referenced data associated with each component and comparing the extents of each component. In some embodiments, the shape file may be aligned with the imagery/data by identification of one or more features of the roof and alignment of such feature(s) as found in each of the components. According to some embodiments, portions of the imagery/data that do not align with and/or fall outside the extents of the shape file may be deleted, cut, removed, and/or otherwise discarded or ignored, thereby defining a trimmed high-resolution image (and/or data set). While the original (pre-trimming) high-resolution image may comprise an image resolution or size of five thousand pixels by five thousand pixels (5,000 x 5,000) or more, such as ten thousand by twenty thousand pixels (10,000 x 20,000), for example, the trimmed high-resolution image may comprise an image resolution of eight thousand by eighteen thousand pixels (8,000 x 18,000) or more (e.g., some number of pixels in the x-direction and/or y-direction (and/or z-direction, if applicable) may be cut from the original image, changing the overall image resolution thereof).

According to some embodiments, the method 300 may comprise segmenting (e.g., by the electronic processing device) the trimmed high-resolution image into a plurality of image tiles, at 308. While the trimmed high-resolution image may comprise an image resolution or size of at least several thousand pixels by several thousand pixels, for example, such a resolution may prove too data-intensive to effectively perform timely image processing thereof. In some embodiments, the trimmed image may be segmented into the plurality of smaller size image tiles with each image tile comprising an image resolution/size, for example, in the range of two hundred by two hundred pixels (200 x 200) to three hundred by three hundred pixels (300 x 300), such as two hundred fifty-six by two hundred fifty-six pixels (256 x 256). In the example case of the trimmed image comprising eight thousand by eighteen thousand pixels (8,000 x 18,000) and each image tile comprising two hundred fifty-six by two hundred fifty-six pixels (256 x 256), for example, approximately two thousand one hundred ninety-eight (2,198) image tiles may be defined by segmentation of the trimmed high-resolution image (assuming optimal image shape and tile distribution). According to some embodiments, the segmenting may preserve the spatial resolution of the imagery/data such that each image tile comprises a spatial resolution of, for example, seven and one half centimeters (7.5 cm) per pixel (e.g., "high-resolution" image tiles). According to some embodiments, the image tiles may be defined by application of a segmentation algorithm to the trimmed high-resolution image. In some embodiments, each image tile may be assigned a unique identifier and/or may be defined in relation to adjacent image tiles. An identifier for each image tile, as well as relative (and/or actual) location information for each image tile, may be stored, for example, in a database and/or file.

In some embodiments, the method 300 may comprise selecting (e.g., by the electronic processing device) an image tile for analysis, at 310. After the trimming and segmenting at 306 and 308 respectively, for example, the method 300 may comprise an iterative selection of each of the image tiles comprising the trimmed high-resolution image/data array. According to some embodiments, each image tile may be analyzed in turn based on an identifier and/or location of the image tile. In some embodiments, an image tile may be selected randomly from the set of image tiles. In some embodiments, only a subset of the image tiles may be identified and/or selected for analysis.

According to some embodiments, the method 300 may comprise identifying (e.g., by the electronic processing device) a roof feature (e.g., defect) in the selected image tile, at 312. One or more trained AI algorithms and/or modules may be employed, for example, to identify an occurrence of an image/data pattern/value that matches predefined AI criteria indicative of a particular type of identifiable feature. In some embodiments, the identifying may be leveraged for roof scoring analysis and/or for prefiltering of image tiles. Prefiltering may be conducted, for example, to remove one or more image tiles from the listing of image tiles for analysis and/or to flag certain image tiles with a status that prevents and/or modifies the analysis thereof. In the case that the segmenting of the trimmed high-resolution imagery/data results in one or image tiles that represent areas and/or objects other than the desired object/roof (e.g., an adjacent roof, a yard or parking lot adjacent to the building), for example, such image tiles may be excluded from analysis in the case that the percentage of the image tile that represents the desired roof area is below a predetermined threshold (e.g., less than fifty percent (50%) of the image tile is descriptive of the desired object/roof). According to some embodiments, such prefiltering may comprise a first image analysis that is utilized to identify image/data portions that are not representative of the desired object/roof (e.g., by identifying colors, textures, shapes, and/or other features that are indicative of the desired object/roof and others that are not). In some embodiments, scoring analysis may comprise identifying a feature from a listing of features that have been determined to be related to roof quality. Such features may comprise, but are not limited to, for example, cracks (e.g., defects in a roof membrane surface), drains (their existence, pooling or ponding indications, and/or clogging indications), roof caps (e.g., visible damage, voids at areas of attachment), roof storage and/or debris (e.g., items or objects on the roof that are not designed to be there), substrate (e.g., the existence and/or degree of exposure of stones, gravel, and/or other roofing substrates, underlayment, etc.), vegetation (e.g., on-roof rooted vegetation and/or overhanging vegetation), roof patches, and/or areas of damage (e.g., missing shingles, coverings, etc.).

In some embodiments, the method 300 may comprise scoring (e.g., by the electronic processing device) the roof feature, at 314. Each preprogrammed identifiable feature may correspond to a score, weight, and/or value, for example, which may be retrieved from a database, table, matrix, and/or file. In some embodiments, different types of features/objects may correspond to different scores and/or values. According to some embodiments, different characteristics of any particular feature may affect the score for the feature. In the case that the feature comprises an identified roof patch area, for example, the size, shape, pattern, data value, and/or location (e.g., relative to one or more other features, such as drains, seams, etc.) of the patch may govern the scoring. While a small roof patch may produce an elevated score, e.g., of six tenths (0.6) on a scale of zero (0) to one (1), for example, a larger roof patch and/or a roof patch within a predetermined distance to a roof drain may produce a less favorable score of, e.g., eight tenths (0.8). Such a difference in scoring may, for example, reflect an increased likelihood of roof drainage problems in the case that a larger roof area has been patched and/or in the case that the patch is adjacent to a drainage feature (e.g., a low point on the roof that is more susceptible to water damage). In some embodiments, the scoring may be calculated and/or computed to reflect a relative magnitude and/or likelihood of risk of damage to the roof. In the case that the feature comprises an identified clogged drain, for example, the scoring of the feature may represent an increased likelihood of water damage due to roof ponding (e.g., due to the clogged drain) and/or may represent an increased likelihood of risk for the roof due to an apparent lack of maintenance thereof. According to some embodiments, certain features (such as the overall lack of maintenance) may be weighted more heavily in the scoring algorithm than other features (such as an individual clogged drain, particularly on a roof having many drains).

According to some embodiments, the method 300 may comprise determining (e.g., by the electronic processing device) whether there are more features to evaluate, at 316. The method 300 may, for example, cycle through a plurality of feature identification algorithms in accordance with one or more AI modules to identify all features of a first particular type and then to identify all features of a second particular type. In the example case of an identified roof patch, for example, an AI module trained to identify roof patches may be executed repeatedly until no more roof patches are identified in the image tile. Similarly, AI modules for different features may be executed until no additional identifiable features are found in the image tile. In the case that more AI modules remain to be executed and/or more features have been identified but not yet scored, the method 300 may revert back to identifying additional features, at 312. In the case that all AI modules have been executed and/or no additional identifiable features have been located in the image tile, the method 300 may continue to compute (e.g., by the electronic processing device) an overall score for the image tile, at 318. All of the individual scores for the individual features identified in the image tile may be utilized, for example, to generate the overall score for the tile. In some embodiments, the scores may be summed, averaged, weighted, and/or otherwise processed in accordance with one or more mathematical formulas or models to define the overall image tile score. In some embodiments, for example, a plurality of individual feature scores may be averaged (weighted or straight) to define the overall score for the particular image tile having been evaluated. In some embodiments, the method 300 may be utilized to analyze a plurality of image tiles, such as each image tile flagged for analysis (e.g., each image tile comprising an amount of usable roof data above a predefined threshold). The method 300 may, for example, determine whether additional image tiles remain to be analyzed, at 320. In the case that more image tiles remain to be analyzed (e.g., feature identification and scoring), the method 300 may revert back to selecting additional image tiles, at 310. In the case that all image tiles have been analyzed, the method 300 may continue to compute (e.g., by the electronic processing device) an overall defectiveness score for the roof, at 322.

In some embodiments, the overall defectiveness score for the roof may be computed by utilizing each of the individual image tile scores as input. According to some embodiments, the individual image tile scores may be summed, averaged, weighted, and/or otherwise processed in accordance with one or more mathematical formulas or models to define the overall defectiveness score for the roof. In some embodiments, for example, a plurality of individual image tile scores may be averaged (weighted or straight) to define the overall defectiveness score for the roof having been evaluated. In some embodiments, cluster analysis, decision trees, and/or other trainable AI-based analysis may be conducted to compute the overall defectiveness score for the roof. According to some embodiments, the overall defectiveness score for the roof may comprise a quantitative value that is indicative of a measure of risk (e.g., of damage) for the roof. In some embodiments, the overall defectiveness score for the roof may be mapped to one or more qualitative labels utilizing a Structured Mapping Engine (SME) of an AI analysis module. The SME may, for example, map various quantitative data ranges for the overall defectiveness score for the roof to the one or more qualitative labels. In one non-limiting example of such mapping, the overall defectiveness score for the roof may be mapped utilizing a qualitative rules matrix such as set forth in Table 1, below:

| Overall defectiveness score for the roof | Qualitative SME Label |
| --- | --- |
| <0.30 | Good |
| 0.30-0.70 | Fair |
| >0.70 | Poor |

According to some embodiments, the overall defectiveness score for the roof (quantitative and/or qualitative) may be utilized to compute a defectiveness trend for the roof/object. The overall defectiveness score for the roof may be calculated based on imagery/data from a first time, for example, and may be compared to other overall defectiveness scores for the roof calculated based on imagery/data from other points in time. In some embodiments, a plurality of previously calculated overall defectiveness scores for the roof may be utilized in conjunction with the currently-calculated overall defectiveness score for the roof to define a mean, standard deviation, and/or other statistical and/or mathematical metric descriptive of the series of scores. According to some embodiments, compared scores may be selected from a plurality of available scores based on one or more similar characteristics between the scoring events. One often significant variation in roof analysis is the amount of leaf cover in areas where deciduous trees are common—and likely to overhang roof structures. In some embodiments, the seasonality (e.g., leaf-on or leaf-off) of the dates the underlying imagery/data were captured may be utilized to select a set of scores for statistical analysis. Such a characteristic-based statistical approach may, for example, permit an understanding regarding whether the changes observed over time are apparent changes in images due to lighting, camera angle, etc., or whether the changes represent actual changes in roof condition. In some embodiments, five (5) seasonally consistent scores may be statistically compared to compute a composite five-lagged z-score for the data set. In some embodiments, the z-score may be utilized to determine whether the current score and/or trend for the data set is indicative of increasing, decreasing, or steady roof deterioration conditions. According to some embodiments, other trend algorithms, linear fit algorithms, seasonality, and/or outlier analysis models may be utilized to analyze the roof data to derive the defectiveness trend for the roof.

In some embodiments, the method 300 may comprise outputting (e.g., by the electronic processing device and/or via a remote user device) the overall defectiveness score (and/or other metrics) for the roof, at 324. A signal may be transmitted, for example, to one or more electronic devices of a user and/or customer, the signal including data identifying the overall defectiveness score, e.g., computed at 322. In some embodiments, the quantitative label, z-score, qualitative trend label, score distribution, and/or other score metrics or information may also or alternatively be output. According to some embodiments, the output information may be provided in various media formats, such as text, pictures/photos, graphics, and/or video. In some embodiments, the format of the output information may be varied based on the capabilities of the destination device (e.g., text to a cell phone, video to a home PC, etc.).

Figure 4A:
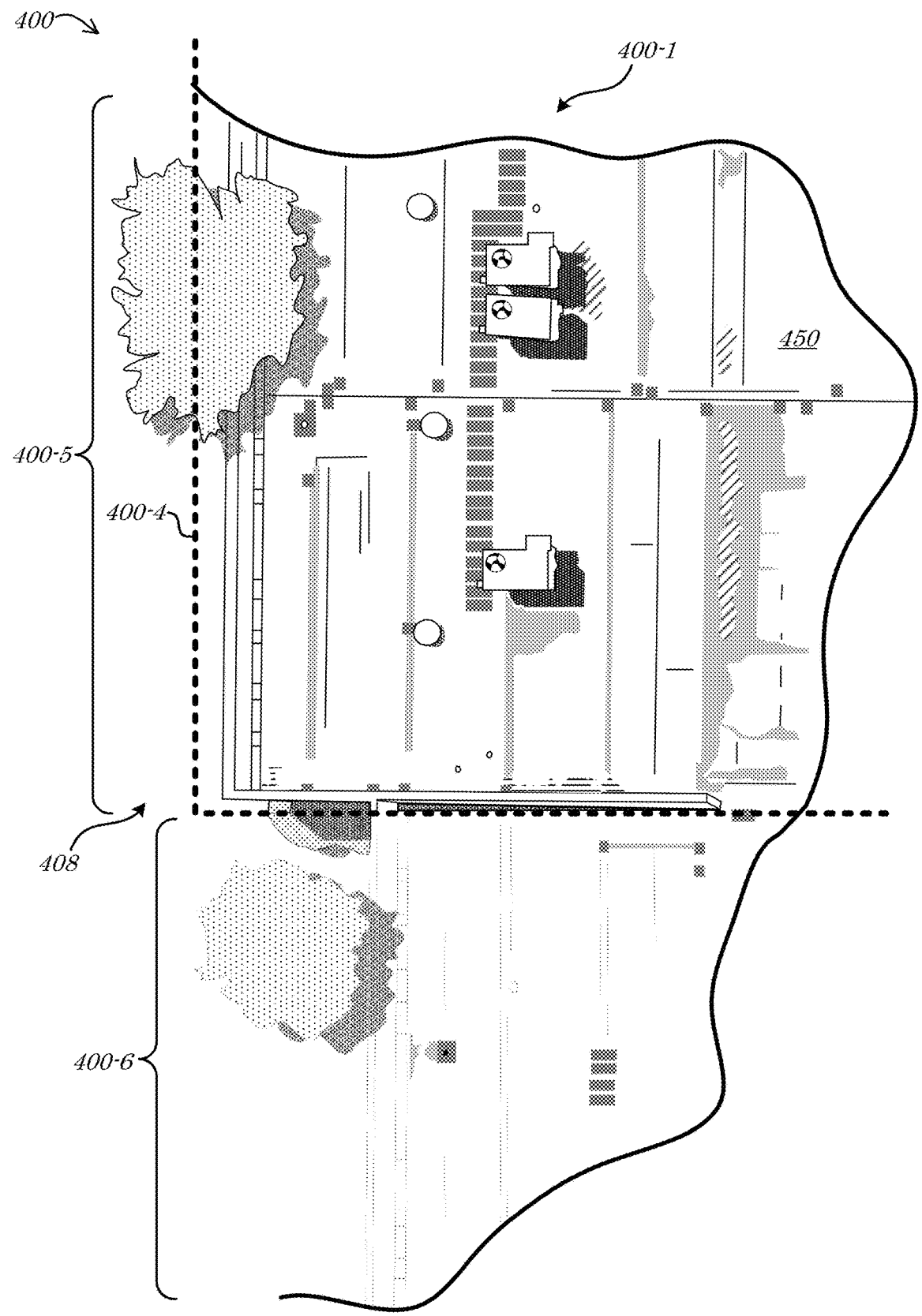
FIG. 4A, FIG. 4B, and FIG. 4C are diagrams of an AI processing process according to some embodiments.
Figure 4B:
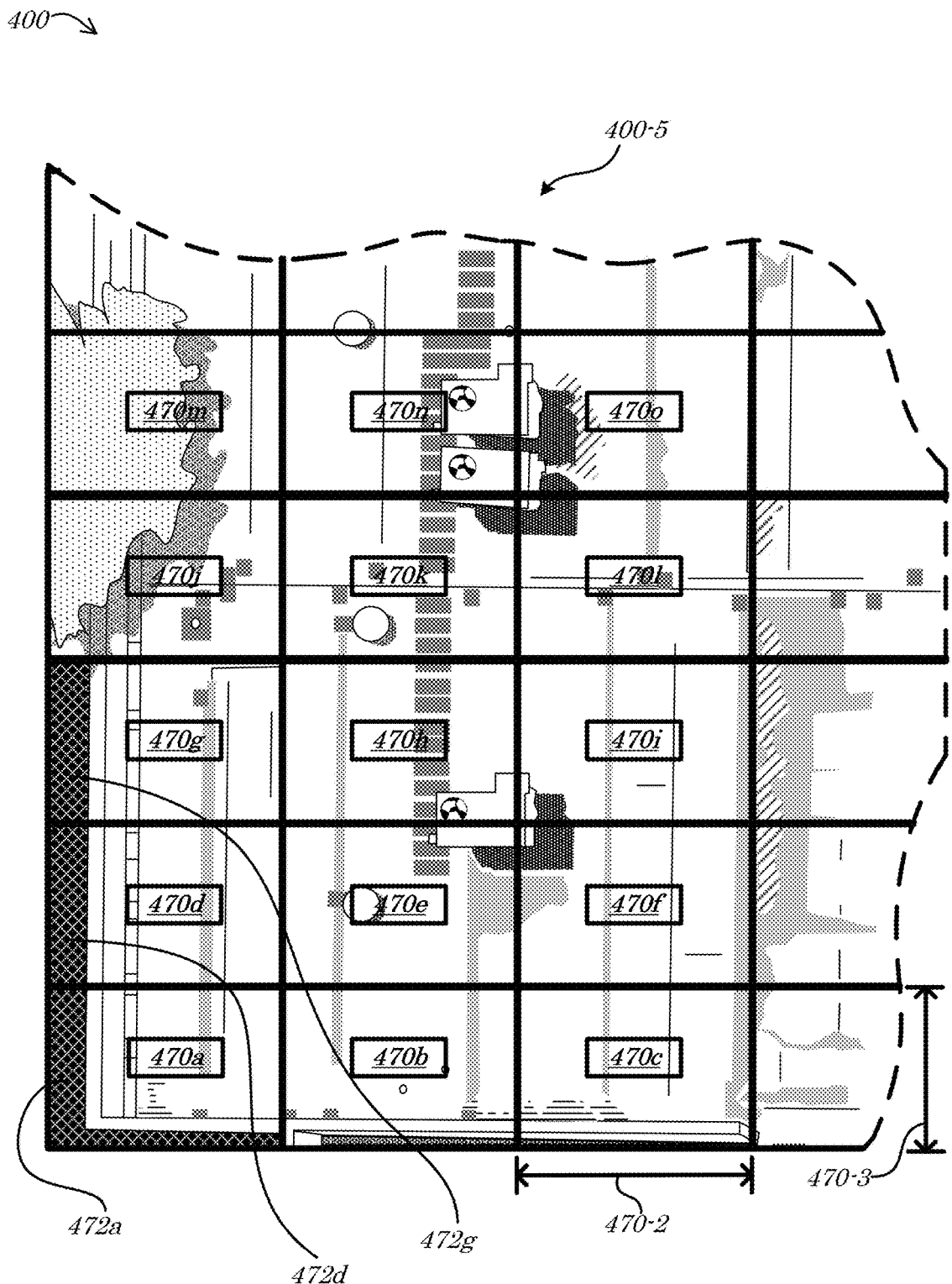
Figure 4C:
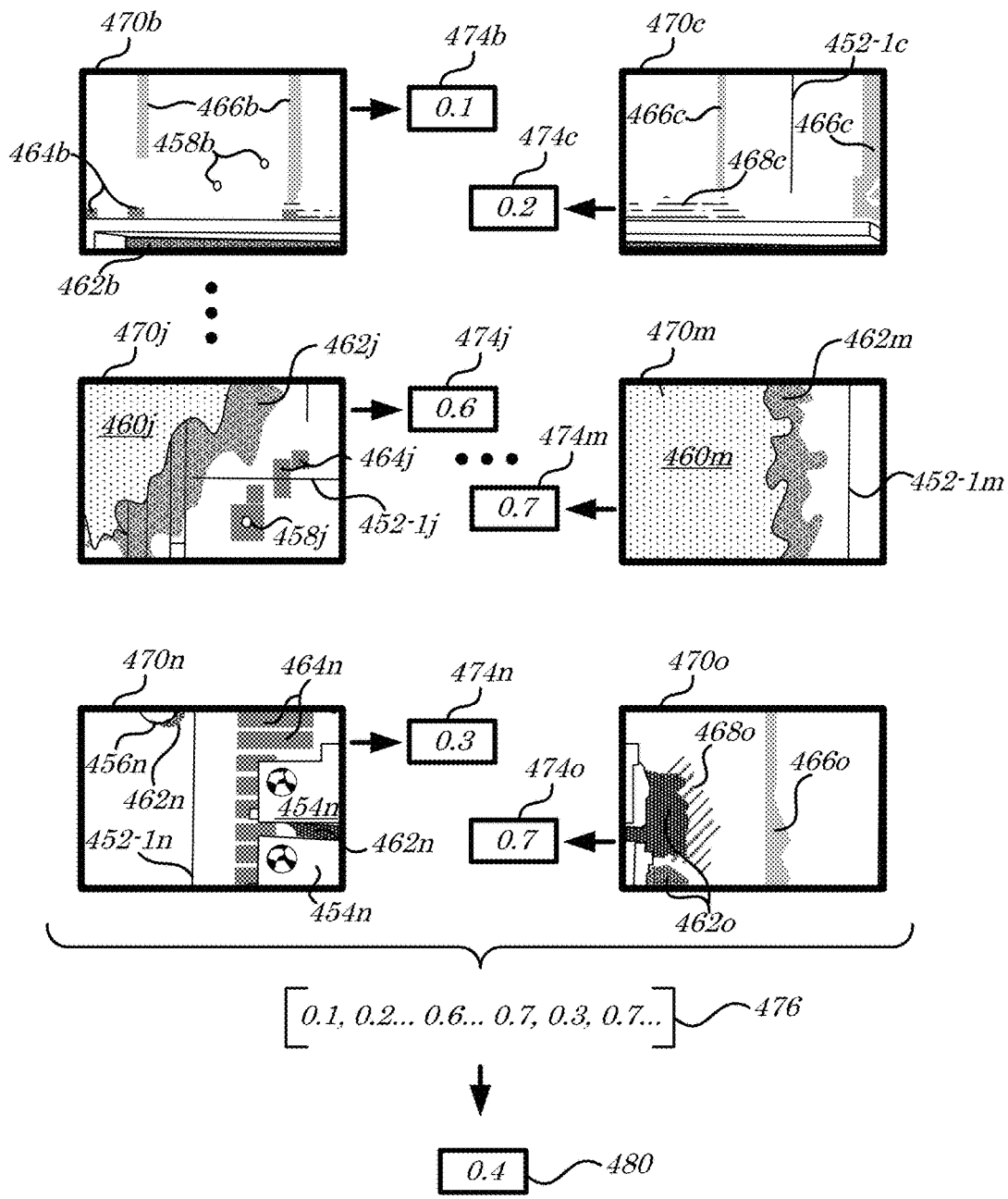

Referring now to FIG. 4A, FIG. 4B, and FIG. 4C, diagrams of an AI processing process 400 according to some embodiments are shown. In some embodiments, the process 400 may be performed and/or implemented by and/or otherwise associated with one or more specialized and/or specially-programmed computers (e.g., one or more of the user device 102, the imaging device 106, the controller device 110, and/or the apparatus 710 of FIG. 1 and/or FIG. 7 herein), computer terminals, computer servers, computer systems and/or networks, and/or any combinations thereof (e.g., by one or more multi-threaded and/or multi-core processing units of AI roof deterioration analysis data processing system). In some embodiments, the process 400 may be embodied in, facilitated by, and/or otherwise associated with various input mechanisms and/or interfaces (such as the interface 720 of FIG. 7 herein).

According to some embodiments, the process 400 may comprise various steps, routines, and/or procedures that operate upon and/or utilize input data, such as an image 400-1, or portion thereof, as depicted in FIG. 4A. In some embodiments, the image 400-1 may comprise a high-resolution image as described herein. The image 400-1, for example, may comprise an aerial image acquired from an aircraft, satellite, etc., and/or may comprise an image received at 302 in the method 300 of FIG. 3 herein. According to some embodiments, the image 400-1 may be edited in accordance with the process 400 by application of a template 400-4 that cuts, crops, and/or trims the image 400-1 into at least a first portion 400-5 and a second portion 400-6. The template 400-4 may, for example, comprise a shape file, point cloud data, and/or other geometric and/or location data, such as the shape file identified at 304 in the method 300 of FIG. 3 herein. In some embodiments, the template 400-4 may be overlaid on and/or compared to (physically and/or mathematically) the image 400-1 with any or all areas falling within the bounds of the template 400-4 being defined as the first portion 400-5 and all areas falling outside of the bounds of the template 400-4 being defined as the second portion 400-6. According to some embodiments, the bounds of the template 400-4 may be utilized to trim, cut, and/or crop (e.g., the trimming at 306 of the method 300 of FIG. 3 herein) the second portion 400-6 from the image 400-1, thereby retaining only the first portion 400-5 of the image 400-1, which may be referred to as the trimmed image or first portion 400-5. In some embodiments, the trimmed image 400-5 may comprise data descriptive of a geographic location 408 and at least one object thereof, such as a roof 450. According to some embodiments, the second portion 400-6 (e.g., that is removed and/or discarded from the image 400-1 via the process 400) may comprise data descriptive of objects and/or areas at or near the location 408 that do not correspond to the roof 450. As described herein, for example, the template 400-4 may comprise data descriptive of the area and/or boundaries of the roof 450 and may accordingly be utilized to trim the image 400-1 to remove data and/or areas (i.e., the second portion 400-6) that do not fall within the boundaries of the roof 450.

In some embodiments, and referring to FIG. 4B, the process 400 may conduct further operations on the trimmed image 400-5. The process 400 may, for example, execute an algorithm to segment, apportion, and/or divide the trimmed image 400-5 into a plurality of image tiles 470a-o (e.g., the segmenting 308 of the method 300 of FIG. 3 herein). According to some embodiments, the image tiles 470a-o may be evenly and/or systematically distributed across the trimmed image 400-5, e.g., forming a grid-pattern as depicted in FIG. 4B. In some embodiments, fewer or more image tiles 470a-o may be generated and/or defined than are depicted in FIG. 4B. According to some embodiments, each image tile 470a-o may comprise and/or be defined by a first or x-dimension 470-2 and a second or y-dimension 470-3. In some embodiments, the x-dimension 470-2 and/or the second or y-dimension 470-3 may be in the range of two hundred (200) pixels to three hundred (300) pixels and in some embodiments as described herein, between two hundred twenty (220) and two hundred sixty (260) pixels. According to some embodiments, the process 400 may remove, discard, ignore, and/or conduct a modified analysis on one or more of the image tiles 470a-o . The process 400 may, for example, execute a first AI program that is configured to filter out image tiles 470a-o that are representative of less than a predetermined threshold amount of area that corresponds to the roof 450.

As depicted in FIG. 4B, for example, three (3) of the image tiles 470a, 470d, 470g may comprise non-roof areas 472a, 472d, 472g. The first AI module may be trained and/or programmed to identify these non-roof areas 472a, 472d, 472g by analyzing colors, reflectivity, patterns, textures, heights/elevations, and/or other data from the trimmed image 400-5. The first AI module may, for example, be trained to identify areas of grass, parking lots, and/or other areas that do not match (e.g., color, saturation, hue, etc.) the characteristics of the roof 450. According to some embodiments, rules may be applied to discard any image tiles 470a-o that contain and/or represent non-roof areas 472a, 472d, 472g that exceed a predefined threshold level. In the case of a seventh image tile 470g having a corresponding identified seventh non-roof area 472g, for example, should the seventh non-roof area 472g exceed a certain percentage (e.g., fifteen percent (15%)) of the overall area of the seventh image tile 470g, the seventh image tile 470g may be discarded and/or flagged as not having enough "useful roof" area to be included in roof deterioration analysis. In some embodiments, as opposed to being discarded or filtered out, the seventh image tile 470g may be additionally trimmed and/or processed to remove and/or discard the seventh non-roof area 472g.

In some embodiments, and referring to FIG. 4C, the process 400 may conduct AI-based roof deterioration analysis on the image tiles 470a-o (e.g., and the trimmed image 400-5). Each image tile 470a-o may be selected (e.g., in-turn), analyzed, and scored, for example. The process 400 may, in some embodiments, select (e.g., the selecting 310 of the method 300 of FIG. 3 herein) one or more image tiles 470b-c, 470j, 470m-o as depicted in FIG. 4C. The subset of image tiles 470b-c, 470j, 470m-o depicted in FIG. 4C are presented for non-limiting purposes of example and ease of explanation. Fewer or more image tiles 470a-o may be selected in series or in parallel, as is or becomes known or practicable. According to some embodiments, each of the selected image tiles 470b-c, 470j, 470m-o may be analyzed pursuant to the process 400 by a second AI module that is trained and/or programmed to identify features of the roof 450 (and/or other object). The second AI module may, for example, identify (e.g., the identifying 312 of the method 300 of FIG. 3 herein) (i) roof cracks or seams 452-1c, 452-1j, 452-1m, 452-1n in respective selected image tiles 470c, 470j, 470m-n, (ii) roof-mounted equipment 454n and/or a roof protrusion 456n in a fourteenth image tile 470n, (iii) roof vents or drains 458b, 458j in a second image tile 470b and a tenth image tile 470j, (iv) overhanging vegetation 460j, 460m in the tenth image tile 470j and a thirteenth image tile 470m, (v) shadow areas 462b, 462j, 462m, 462n, 462o in the second image tile 470b, the tenth image tile 470j, the thirteenth image tile 470m, the fourteenth image tile 470n, and a fifteenth image tile 470o, (vi) roof patches 464b, 464j, 464n in the second image tile 470b, the tenth image tile 470j, and the fourteenth image tile 470n, (vii) discolored areas 466b, 466c, 466o in the second image tile 470b, a third image tile 470c, and the fifteenth image tile 470o, and/or (viii) deviant texture areas 468c, 468o in the third image tile 470c and the fifteenth image tile 470o.

According to some embodiments, any or all of the identified roof features 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466n, 468c, 468o may be scored (e.g., the scoring 314 of the method 300 of FIG. 3 herein) by the process 400. The scoring may comprise, for example, retrieving and/or utilizing (e.g., for each identified roof feature 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o) a score, weight, and/or value stored in a database, table, matrix, and/or file. In some embodiments, different types of objects and/or identified roof features 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o may correspond to different scores and/or values. According to some embodiments, different characteristics of any particular identified roof feature 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o may affect the score for the identified roof feature 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o. In the case that a thirteenth overhanging vegetation feature 460m accounts for a certain first percentage (e.g., approximately fifty percent (50%) as depicted in FIG. 4C) of the thirteenth image tile 470m it may correspond to a score of seven tenths (0.7), for example, while a tenth overhanging vegetation feature 460j that accounts for a certain second percentage (e.g., approximately thirty-three percent (33%) as depicted in FIG. 4C) of the tenth image tile 470j it may correspond to a score of five tenths (0.5).

In some embodiments, each individual score for each identified roof feature 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o in each of the selected image tiles 470b-c, 470j, 470m-o may be utilized to compute an overall score 474b-c, 474j, 474m-o (e.g., the computing 318 of the method 300 of FIG. 3 herein) for each of the selected image tiles 470b-c, 470j, 470m-o. The individual scores may be summed, averaged, weighted, and/or otherwise processed in accordance with one or more mathematical formulas or models, for example, to define the overall scores 474b-c, 474j, 474m-o for the selected image tiles 470b-c, 470j, 470m-o. In some embodiments, for example, a plurality of individual feature scores may be averaged (weighted or straight) to define the overall scores 474b-c, 474j, 474m-o for the selected image tiles 470b-c, 470j, 470m-o. According to some embodiments, the overall scores 474b-c, 474j, 474m-o for the selected image tiles 470b-c, 470j, 470m-o may be compiled and/or arranged in a matrix and/or array 476. In some embodiments, the overall scores 474b-c, 474j, 474m-o for the selected image tiles 470b-c, 470j, 470m-o and/or the array 476 may be utilized as input by the process 400 to compute (e.g., the computing 322 of the method 300 of FIG. 3 herein) an overall defectiveness score 480 (e.g., four tenths (0.4)) for the roof 450. In some embodiments, the overall defectiveness score 480 for the roof 450 may be computed by summing, averaging, weighing, and/or otherwise processing the overall scores 474b-c, 474j, 474m-o in accordance with one or more mathematical formulas or models. In some embodiments, for example, the plurality of individual overall scores 474b-c, 474j, 474m-o may be averaged (weighted or straight) to define the overall defectiveness score 480 for the roof 450.

Fewer or more features and/or components 400-1, 400-4, 400-5, 400-6, 408, 450, 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o, 470a-o, 470-2, 470-3, 472a, 472d, 472g, 474b-c, 474j, 474m-o, 476, 480 and/or various configurations of the depicted features and/or components 400-1, 400-4, 400-5, 400-6, 408, 450, 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o, 470a-o, 470-2, 470-3, 472a, 472d, 472g, 474b-c, 474j, 474m-o, 476, 480 may be included in the process 400 without deviating from the scope of embodiments described herein. In some embodiments, the features and/or components 400-1, 400-4, 400-5, 400-6, 408, 450, 452-1c, 452-1j, 452-1m, 452-1n, 454n, 456n, 458b, 458j, 460j, 460m, 462b, 462j, 462m, 462n, 462o, 464b, 464j, 464n, 466b, 466c, 466o, 468c, 468o, 470a-o, 470-2, 470-3, 472a, 472d, 472g, 474b-c, 474j, 474m-o, 476, 480 may be similar in configuration and/or functionality to similarly named and/or numbered features and/or components as described herein.

Figure 5:
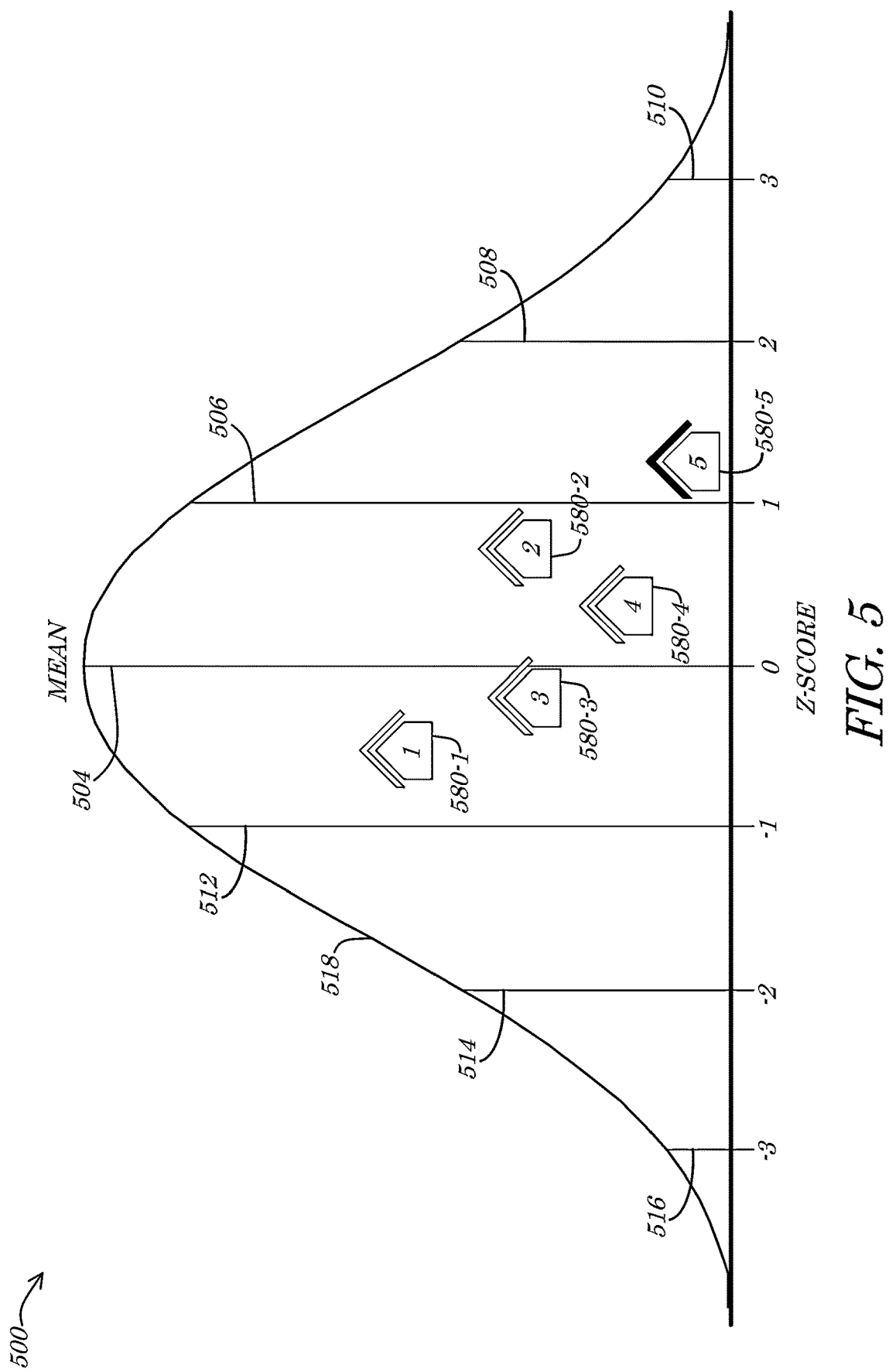
FIG. 5 is a diagram of mathematical distribution process according to some embodiments.

Turning no to FIG. 5, a diagram of mathematical distribution process 500 according to some embodiments is shown. The process 500 may comprise, for example, a statistical score analysis algorithm that operates upon and/or defines a mean score 504, a first positive standard deviation or first positive z-score 506, a second positive standard deviation or second positive z-score 508, a third positive standard deviation or third positive z-score 510, a first negative standard deviation or first negative z-score 512, a second negative standard deviation or second negative z-score 514, and/or a third negative standard deviation or third negative z-score 516. In some embodiments, the mean score 504 and/or the various z-scores 506, 508, 510, 512, 514, 516 may define and/or be mathematically tied to a score distribution 518 (depicted as a standard bell-curve distribution for non-limiting purposes of example in FIG. 5). According to some embodiments, the score distribution 518 may represent a distribution of roof deterioration scores that may be computed and/or calculated via the method 300 and/or the process 400 of FIG. 3 and/or FIG. 4 herein. In some embodiments, the score distribution 518 may comprise a plurality of comparable scores 580-1, 580-2, 580-3, 580-4, 580-5 (e.g., comparable due to having at least one characteristic in common, such as being calculated from data acquired at the same time of year (seasonality), during similar weather conditions, times of day, etc.), such as a most-recent score 580-5 for a particular object/roof and a set of four (4) or more previous scores 580-1, 580-2, 580-3, 580-4 for the same object/roof. According to some embodiments, the process 500 may comprise computing the z-scores for each of the plurality of comparable scores 580-1, 580-2, 580-3, 580-4, 580-5 and comparing the calculated z-scores to determine whether the analyzed object/roof is deteriorating (e.g., a progression of z-scores in the negative direction), improving (e.g., a progression of z-scores in the positive direction), or constant (e.g., z-score progression in either direction that is below a predefined threshold). In some embodiments, a five (5)-lagged composite z-score may be calculated to characterize (and/or score, rank, label, etc.) the progression of object/roof condition as analyzed by the AI systems and processes described herein. According to some embodiments, the results of the progression analysis may be converted to a qualitative label such as "stable", "deteriorating", or "improved" by cross-referencing the numeric result with a matrix or table identifying applicable labels for different ranges in value. As depicted for non-limiting purposes of example with respect to the plurality of comparable scores 580-1, 580-2, 580-3, 580-4, 580-5 in FIG. 5, a first score 580-1, a second score 580-2, a third score 580-3, and a fourth score 580-4 all fall within one standard deviation (plus or minus; e.g., a z-score between one and negative one) of the mean score 504, which may be an indication that the roof being analyzed is stable (i.e., neither deteriorating nor improving). A fifth score 580-5, which may be the most current score for example, has a z-score of greater than one (1) however, indicating that the fifth score 580-5 is either an outlier or that the condition of the roof is improving (e.g., due to a recent repair or replacement).

IV. AI Roof Deterioration Analysis Data Storage Structures

Referring now to FIG. 6, diagrams of an example data storage structure 640 according to some embodiments are shown. In some embodiments, the data storage structure 640 may comprise a plurality of data tables, such as a data table 644a, a shape file table 644b, and/or an image tile table 644c. The data tables 644a-c may, for example, be utilized in an execution of an AI roof deterioration analysis process, as described herein.

The data table 644a may comprise, in accordance with some embodiments, a data IDentifer (ID) 644a-1, a data type field 644a-2, a data location field 644a-3, a location ID field 644a-4, a resolution field 644a-5, and/or a size field 644a-6. In some embodiments, the data stored in the data table 644a may comprise high-resolution imagery and/or other data files, matrices, arrays, and/or values descriptive of one or more objects (e.g., a roof) at a geographic location, e.g., at a particular time. The shape file table 644b may comprise, in accordance with some embodiments, a location ID field 644b-1, a location field 644b-2, a shape file field 644b-3, and/or a shape file type field 644b-4. In some embodiments, the data stored in the shape file table 644b may comprise one or more shape and/or location-based data elements descriptive of the boundaries and/or extents of a particular object, structure, building, and/or roof thereof. In some embodiments, the image tile table 644c may comprise a tile ID field 644c-1, a data ID field 644c-2, a resolution field 644c-3, a size field 644c-4, and/or a score field 644c-5. According to some embodiments, data stored in the image tile table 644c may comprise data descriptive of a plurality of image tiles that have been defined based on a segmentation of an underlying high-resolution image/data matrix.

In some embodiments, data processing results, such as AI roof deterioration analysis scores and/or value results, may be defined utilizing relationships established between two or more of the data tables 644a-c. As depicted in the example data storage structure 640, for example, a first relationship "A" may be established between the data table 644a and the shape file table 644b. In some embodiments (e.g., as depicted in FIG. 6), the first relationship "A" may be defined by utilizing the location ID field 644a-4 as a data key linking to the location ID field 644b-1. According to some embodiments, the first relationship "A" may comprise any type of data relationship that is or becomes desirable, such as a one-to-one, one-to-many, many-to-many, or many-to-one relationship. In the case that a shape file may exist for any particular location, the first relationship "A" may comprise a one-to-one relationship. In such a manner, for example, location data may be utilized to compare, query, and/or otherwise process against the shape file table 644b to identify one or more shape files for a particular location. The shape file(s) may be utilized, for example, to trim a high-resolution image stored in (and/or referenced by) the data table 644a.

According to some embodiments, a second relationship "B" may be established between the data table 644a and the image tile table 644c. In some embodiments (e.g., as depicted in FIG. 6), the second relationship "B" may be defined by utilizing the data ID 644a-1 as a data key linking to the data ID field 644*c*-2. According to some embodiments, the second relationship "B" may comprise any type of data relationship that is or becomes desirable, such as a one-to-one, one-to-many, many-to-many, or many-to-one relationship. In the case that a plurality of image tiles are generated with respect to and/or for any given image file stored in (and/or referenced by) the data table 644*a*, for example, the second relationship "B" may comprise a many-to-one relationship. In such a manner, for example, the relationship between an image and the segmented image tiles thereof may be utilized to perform mathematical operations, such as summing and/or averaging scores for the image stored in the score field 644*c*-5.

In some embodiments, fewer or more data fields than are shown may be associated with the data tables 644*a-c*. Only a portion of one or more databases and/or other data stores is necessarily shown in FIG. 6, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

V. AI Roof Deterioration Analysis Apparatus and Articles of Manufacture

Figure 7:
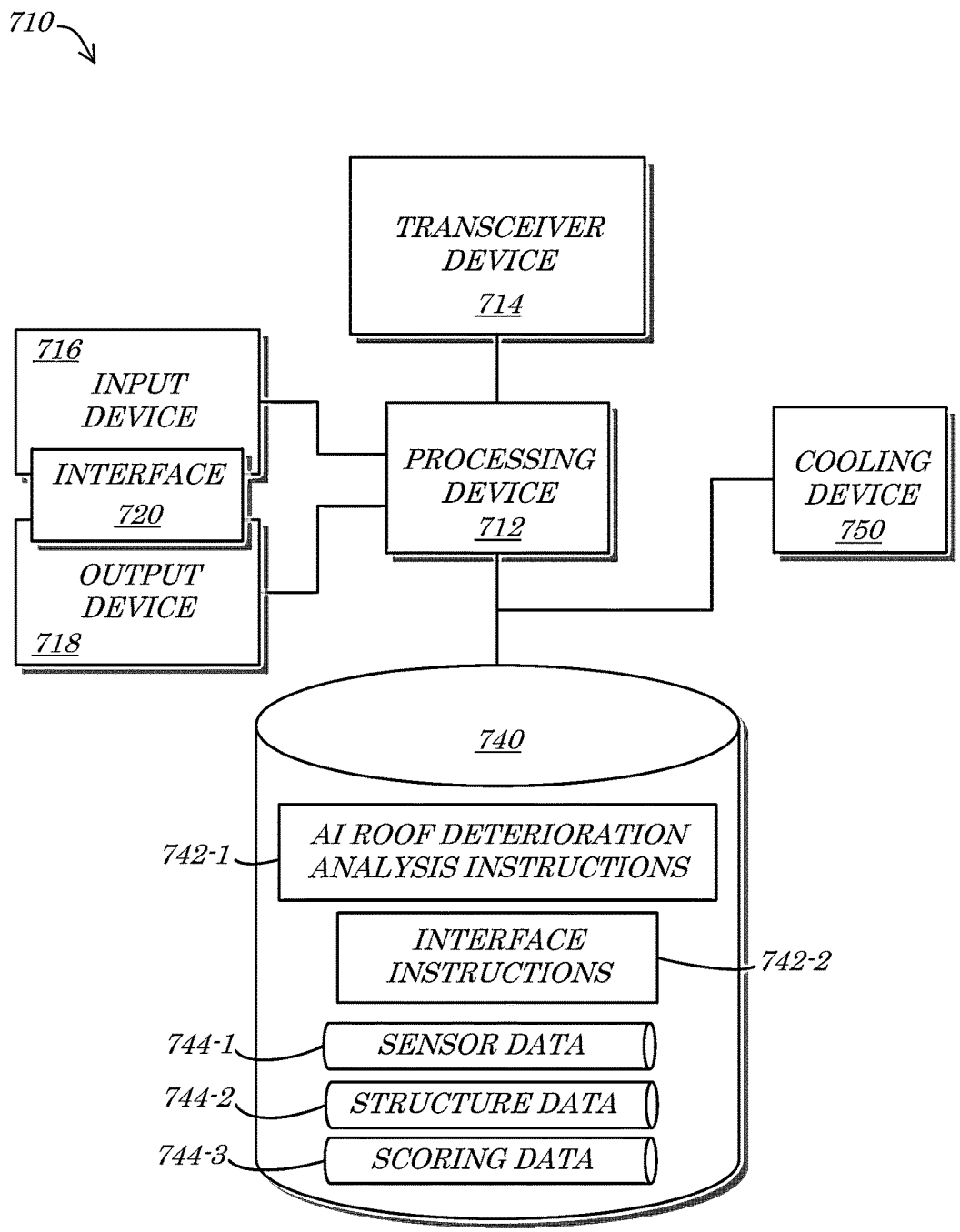
FIG. 7 is a block diagram of an apparatus according to some embodiments.
Figure 8A:
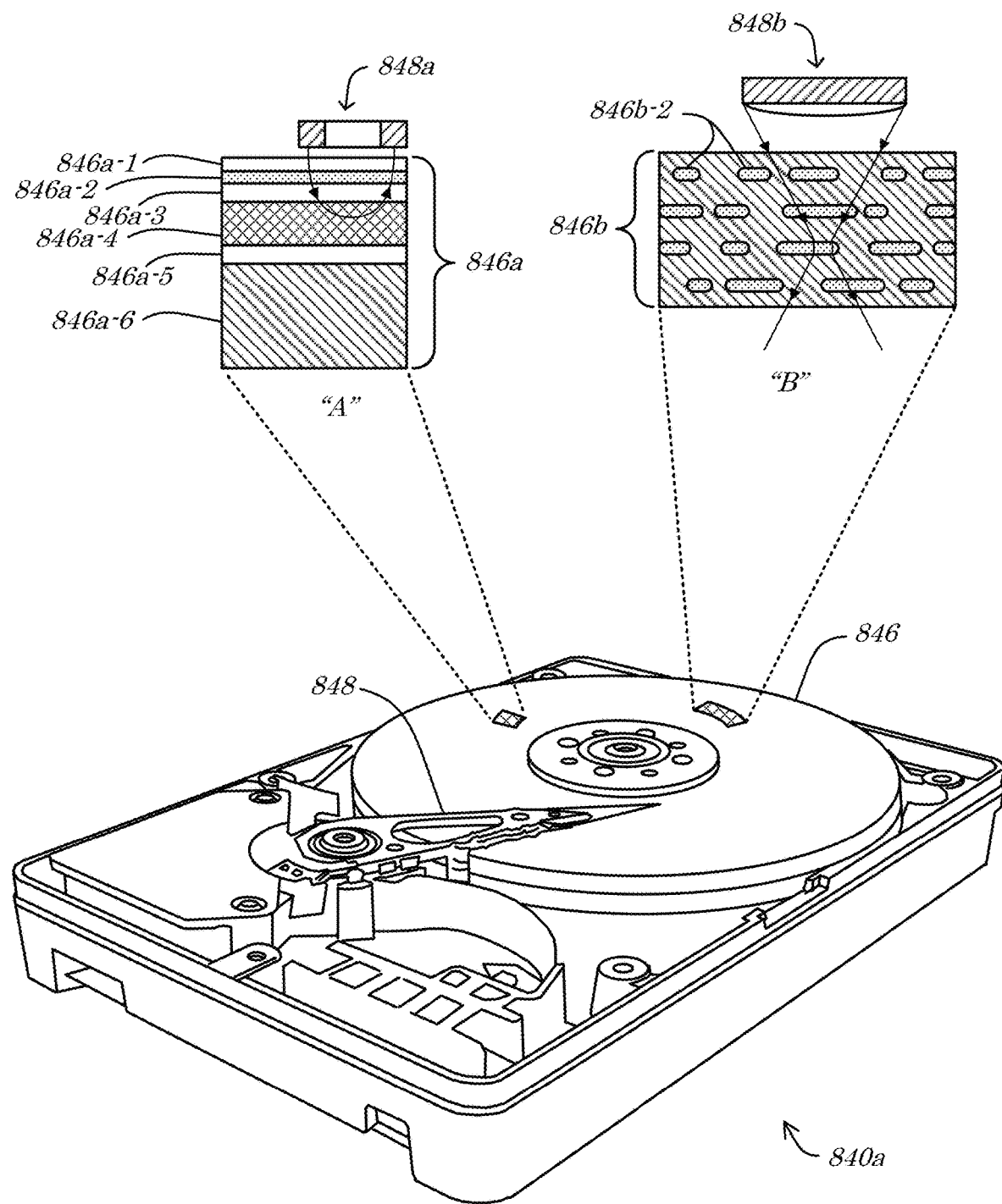
FIG. 8A, FIG. 8B, FIG. 8C, FIG. 8D, and FIG. 8E are perspective diagrams of exemplary data storage devices according to some embodiments.
Figure 8B:
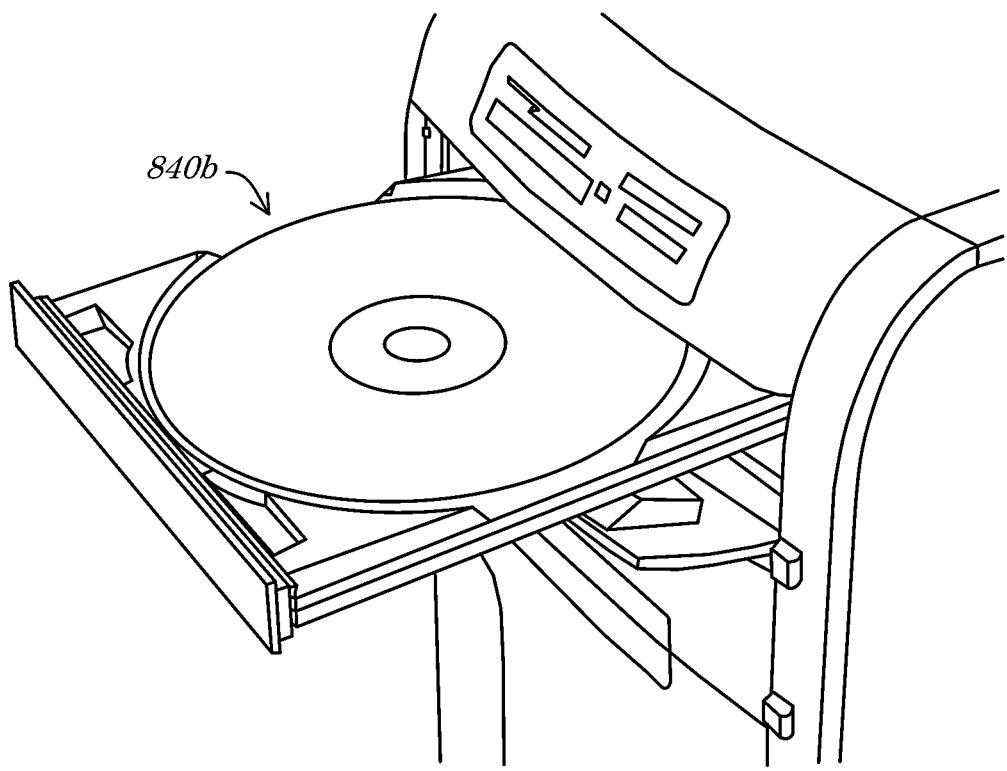
Figure 8C:
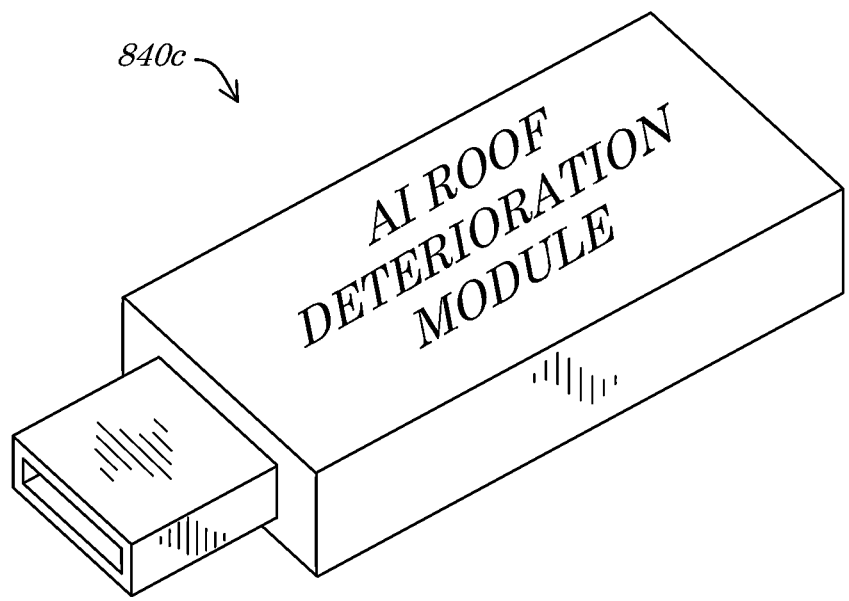
Figure 8D:
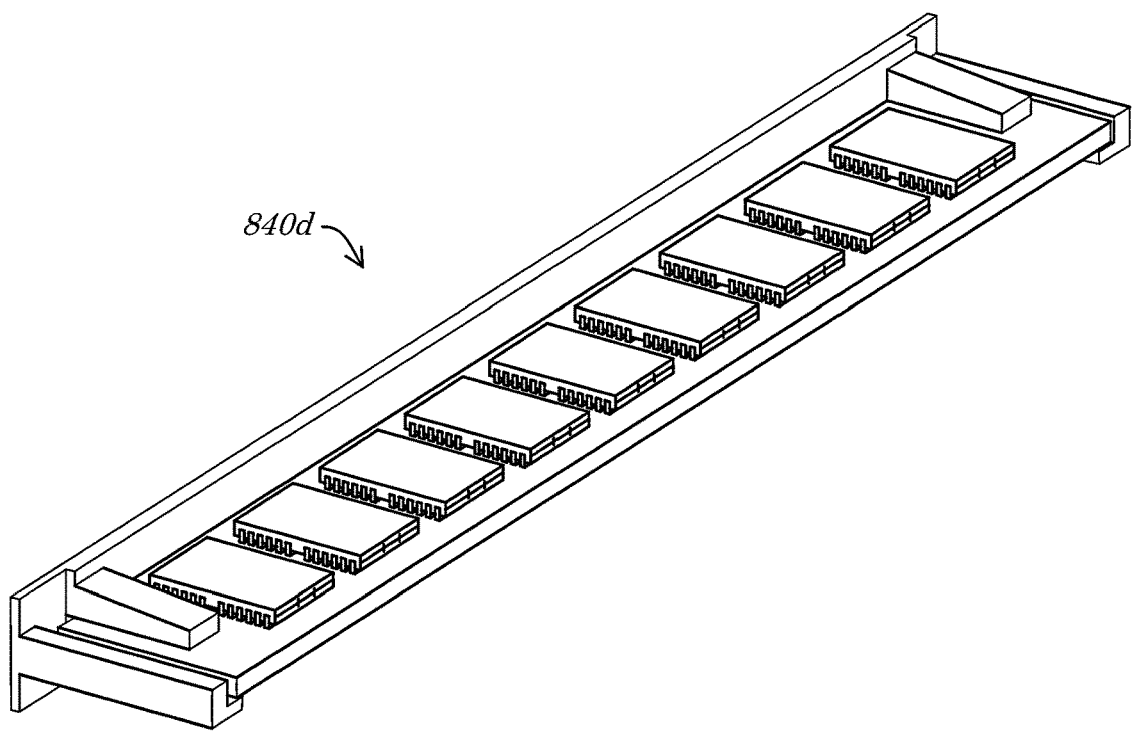
Figure 8E:
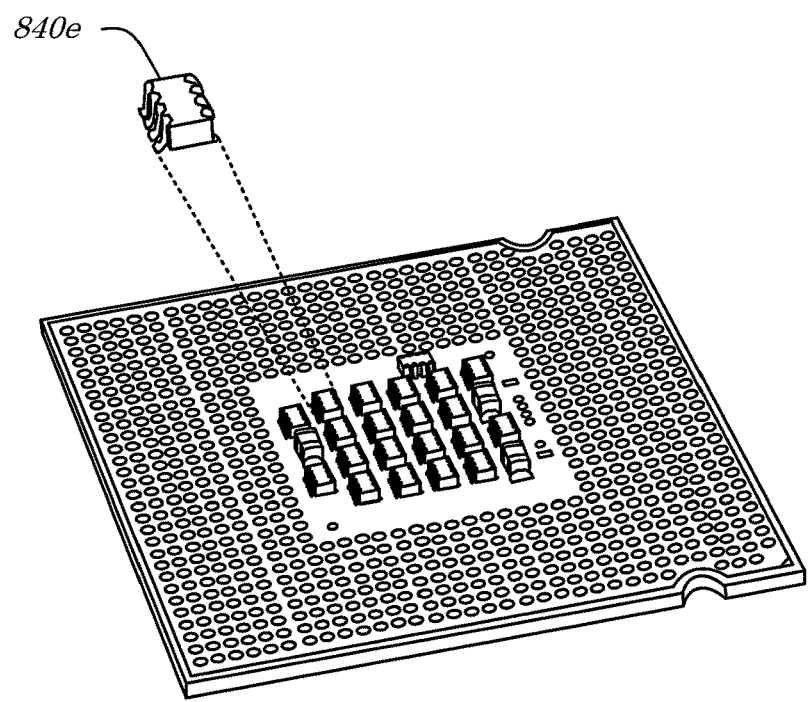

Turning to FIG. 7, a block diagram of an AI device or other apparatus 710 according to some embodiments is shown. In some embodiments, the apparatus 710 may be similar in configuration and/or functionality to any of the user device 102, the imaging device 106, and/or the controller device 110 of FIG. 1 herein. The apparatus 710 may, for example, execute, process, facilitate, and/or otherwise be associated with the methods/processes 300, 400, 500 of FIG. 3, FIG. 4A, FIG. 4B, FIG. 4C, and/or FIG. 5 herein, and/or portions or combinations thereof. In some embodiments, the apparatus 710 may comprise a processing device 712, a transceiver device 714, an input device 716, an output device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 be included in the apparatus 710 without deviating from the scope of embodiments described herein.

According to some embodiments, the processor 712 may be or include any type, quantity, and/or configuration of processor that is or becomes known. The processor 712 may comprise, for example, an Intel® IXP 2800 network processor or an Intel® XEON™ Processor coupled with an Intel® E6501 chipset. In some embodiments, the processor 712 may comprise multiple interconnected processors, microprocessors, and/or micro-engines. According to some embodiments, the processor 712 (and/or the apparatus 710 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 710 comprises a server, such as a blade server, necessary power may be supplied via a standard AC outlet, power strip, surge protector, and/or Uninterruptible Power Supply (UPS) device.

In some embodiments, the transceiver device 714 may comprise any type or configuration of communication device that is or becomes known or practicable. The transceiver device 714 may, for example, comprise a Network Interface Card (NIC), a telephonic device, a cellular network device, a router, a hub, a modem, and/or a communications port or cable. According to some embodiments, the transceiver device 714 may also or alternatively be coupled to the processor 712. In some embodiments, the transceiver device 714 may comprise an IR, RF, Bluetooth™, Near-Field Communication (NFC), and/or Wi-Fi® network device coupled to facilitate communications between the processor 712 and another device (not shown).

According to some embodiments, the input device 716 and/or the output device 718 may be communicatively coupled to the processor 712 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., a user, such as to initiate and/or review AI roof deterioration analysis scores/results, as described herein). The output device 718 may, according to some embodiments, comprise a display screen and/or other practicable output component and/or device. The output device 718 may, for example, provide an interface (such as the interface 720) via which AI roof deterioration analysis data or information is provided to a user (e.g., via a website and/or mobile application). According to some embodiments, the input device 716 and/or the output device 718 may comprise and/or be embodied in a single device, such as a touch-screen monitor or display.

The memory device 740 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of AI roof deterioration analysis instructions 742-1 and/or interface instructions 742-2, sensor data 744-1, structure data 744-2, and/or scoring data 744-3. In some embodiments, the AI roof deterioration analysis instructions 742-1, interface instructions 742-2, sensor data 744-1, structure data 744-2, and/or scoring data 744-3 may be utilized by the processor 712 to provide output information via the output device 718 and/or the transceiver device 714.

According to some embodiments, the AI roof deterioration analysis instructions 742-1 may be operable to cause the processor 712 to process sensor data 744-1, structure data 744-2, and/or scoring data 744-3 in accordance with embodiments as described herein. Sensor data 744-1, structure data 744-2, and/or scoring data 744-3 received via the input device 716 and/or the transceiver device 714 may, for example, be analyzed, sorted, filtered, decoded, decompressed, ranked, scored, plotted, and/or otherwise processed by the processor 712 in accordance with the AI roof deterioration analysis instructions 742-1. In some embodiments, sensor data 744-1, structure data 744-2, and/or scoring data 744-3 may be fed by the processor 712 through one or more mathematical and/or statistical formulas and/or models in accordance with the AI roof deterioration analysis instructions 742-1 to conduct an AI-based analysis (utilizing one or more AI modules) of roof/object deterioration by scoring discrete features and computing a metric of change based on a times series of computed scores, as described herein.

In some embodiments, the interface instructions 742-2 may be operable to cause the processor 712 to process sensor data 744-1, structure data 744-2, and/or scoring data 744-3 in accordance with embodiments as described herein. Sensor data 744-1, structure data 744-2, and/or scoring data 744-3 received via the input device 716 and/or the transceiver device 714 may, for example, be analyzed, sorted, filtered, decoded, decompressed, ranked, scored, plotted, and/or otherwise processed by the processor 712 in accordance with the interface instructions 742-2. In some embodiments, sensor data 744-1, structure data 744-2, and/or scoring data 744-3 may be fed by the processor 712 through one or more mathematical and/or statistical formulas and/or models in accordance with the interface instructions 742-2 provide an interface (such as the interface 720) via which input and/or output descriptive of AI roof deterioration analysis may be provided, as described herein.

According to some embodiments, the apparatus 710 may comprise the cooling device 750. According to some embodiments, the cooling device 750 may be coupled (physically, thermally, and/or electrically) to the processor 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

Referring now to FIG. 8A, FIG. 8B, FIG. 8C, FIG. 8D, and FIG. 8E, perspective diagrams of exemplary data storage devices 840a-e according to some embodiments are shown. The data storage devices 840a-e may, for example, be utilized to store instructions and/or data, such as the AI roof deterioration analysis instructions 742-1, interface instructions 742-2, sensor data 744-1, structure data 744-2, and/or scoring data 744-3, each of which is presented in reference to FIG. 7 herein. In some embodiments, instructions stored on the data storage devices 840a-e may, when executed by a processor, cause the implementation of and/or facilitate the methods/processes 300, 400, 500 of FIG. 3, FIG. 4A, FIG. 4B, FIG. 4C, and/or FIG. 5 herein.

According to some embodiments, the first data storage device 840a may comprise one or more various types of internal and/or external hard drives. The first data storage device 840a may, for example, comprise a data storage medium 846 that is read, interrogated, and/or otherwise communicatively coupled to and/or via a disk reading device 848. In some embodiments, the first data storage device 840a and/or the data storage medium 846 may be configured to store information utilizing one or more magnetic, inductive, and/or optical means (e.g., magnetic, inductive, and/or optical-encoding). The data storage medium 846, depicted as a first data storage medium 846a for example (e.g., breakout cross-section "A"), may comprise one or more of a polymer layer 846a-1, a magnetic data storage layer 846a-2, a non-magnetic layer 846a-3, a magnetic base layer 846a-4, a contact layer 846a-5, and/or a substrate layer 846a-6. According to some embodiments, a magnetic read head 848a may be coupled and/or disposed to read data from the magnetic data storage layer 846a-2.

In some embodiments, the data storage medium 846, depicted as a second data storage medium 846b for example (e.g., breakout cross-section "B"), may comprise a plurality of data points 846b-2 disposed with the second data storage medium 846b. The data points 846b-2 may, in some embodiments, be read and/or otherwise interfaced with via a laser-enabled read head 848b disposed and/or coupled to direct a laser beam through the second data storage medium 846b.

In some embodiments, the second data storage device 840b may comprise a CD, CD-ROM, DVD, Blu-Ray™ Disc, and/or other type of optically-encoded disk and/or other storage medium that is or becomes know or practicable. In some embodiments, the third data storage device 840c may comprise a USB keyfob, dongle, and/or other type of flash memory data storage device that is or becomes know or practicable. In some embodiments, the fourth data storage device 840d may comprise RAM of any type, quantity, and/or configuration that is or becomes practicable and/or desirable. In some embodiments, the fourth data storage device 840d may comprise an off-chip cache, such as a Level 2 (L2) cache memory device. According to some embodiments, the fifth data storage device 840e may comprise an on-chip memory device, such as a Level 1 (L1) cache memory device.

The data storage devices 840a-e may generally store program instructions, code, and/or modules that, when executed by a processing device cause a particular machine to function in accordance with one or more embodiments described herein. The data storage devices 840a-e depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An Artificial Intelligence (AI) roof deterioration analysis system, comprising:
an electronic processing device; and
a non-transitory computer readable memory device in communication with the electronic processing device, the non-transitory computer readable memory device storing AI roof deterioration analysis instructions that, when executed by the electronic processing device, result in:
receiving a high-resolution image of a property upon which a structure comprising a roof is situated, the high-resolution image being taken at a first time;
identifying, based on a location of the property, a shape file descriptive of a shape of the roof;
trimming, by overlaying the high-resolution image of the property and the shape of the roof, the high-resolution image, thereby defining a high-resolution roof image;
segmenting the high-resolution roof image into a plurality of image tiles; identifying, utilizing defect detection rules defined by the AI roof deterioration analysis instructions, and for each image tile of the plurality of image tiles, a plurality of features of the image tile;
scoring, based on a feature scoring model of the AI roof deterioration analysis instructions, each of the plurality of features of each image tile;
computing, utilizing scores for each of the plurality of features of each image tile, an overall score for each image tile;

computing, utilizing the overall scores for each of the image tiles of the plurality of image tiles, a first overall defectiveness score for the roof;

outputting the first overall defectiveness score for the roof;

identifying a plurality of previous overall defectiveness scores for the roof that are based on a respective plurality of previous high-resolution images of the property taken at a plurality of previous times before the first time;

computing, based on a comparison of the plurality of previous overall defectiveness scores to the first overall defectiveness score, a measure of deviation of the first overall defectiveness score with respect to the plurality of previous overall defectiveness scores;

comparing the measure of deviation to a stored deviation threshold; and classifying, based on the comparing, the roof as being either (i) deteriorating, in the case that the measure of deviation exceeds or equals the deviation threshold or (ii) improving, in the case that the measure of deviation falls below the deviation threshold.

2. The AI roof deterioration analysis system of claim 1, wherein the AI roof deterioration analysis instructions, when executed by the electronic processing device, further result in:

converting the first overall defectiveness score for the roof to a qualitative identifier based on application of a qualitative rules matrix to the first overall defectiveness score for the roof.

3. The AI roof deterioration analysis system of claim 1, wherein the AI roof deterioration analysis instructions, when executed by the electronic processing device, further result in:

identifying, utilizing useful roof rules defined by the AI roof deterioration analysis instructions, and for each image tile of the plurality of image tiles, a ratio descriptive of how much of the image tile corresponds to the roof and how much of the image tile does not correspond to the roof;

comparing the ratio to a stored useful roof threshold; and classifying, based on the comparing, each image tile as being either (i) a useful roof image tile, in the case that the ratio exceeds or equals the useful roof threshold or (ii) a non-useful roof image tile, in the case that the ratio falls below the useful roof threshold.

4. The AI roof deterioration analysis system of claim 3, wherein the identifying of the plurality of features for each image tile is conducted utilizing only those image tiles that are classified as useful roof image tiles.

5. The AI roof deterioration analysis system of claim 1, wherein the measure of deviation comprises a statistical z-score.

6. The AI roof deterioration analysis system of claim 5, wherein the measure of deviation comprises a statistical five-lagged composite z-score.

7. The AI roof deterioration analysis system of claim 1, wherein the plurality of previous overall defectiveness scores comprises at least four previous overall defectiveness scores that are based on a respective at least four previous high-resolution images of the property taken at least four previous times before the first time.

8. The AI roof deterioration analysis system of claim 7, wherein all of the previous times and the first time coincide with a least one of the same (i) season, (ii) month, (iii) time of day, and (iv) weather condition.

9. The AI roof deterioration analysis system of claim 1, wherein the high-resolution image comprises a spatial resolution of not more than ten centimeters per pixel.

10. The AI roof deterioration analysis system of claim 1, wherein the high-resolution image comprises a size of at least ten thousand square pixels.

11. The AI roof deterioration analysis system of claim 1, wherein the high-resolution image comprises at least three bands of input data.

12. The AI roof deterioration analysis system of claim 1, wherein each image tile of the plurality of image tiles is sized at less than or equal to two hundred fifty-six by two hundred fifty-six pixels.

13. The AI roof deterioration analysis system of claim 1, wherein the identified plurality of features of each image tile comprises at least two of: (i) cracks, (ii) ponding, (iii) caps, (iv) debris, (v) bare areas, (vi) vegetation, (vii) patches, and (viii) damaged portions.

14. The AI roof deterioration analysis system of claim 1, wherein the feature scoring model defines a plurality of classifications for each feature and assigns a numeric value to each classification.

15. The AI roof deterioration analysis system of claim 14, wherein the numeric values range from zero to one and are indicative of a likelihood of a particular feature being descriptive of a defect in the roof.

16. The AI roof deterioration analysis system of claim 1, wherein the computing, utilizing the scores for each of the plurality of features of each image tile, of the overall score for each image tile, comprises:

averaging the scores for each of the plurality of features of the image tile.

17. The AI roof deterioration analysis system of claim 1, wherein the computing, utilizing the scores for each of the plurality of features of each image tile, of the overall score for each image tile, comprises:

computing a weighted average of the scores for each of the plurality of features of the image tile.

* * * * *